US00RE47757E

(19) United States
(12) Reissued Patent
Hering et al.

(10) Patent Number: US RE47,757 E
(45) Date of Reissued Patent: *Dec. 3, 2019

(54) SYSTEM AND METHOD FOR IDENTIFYING AND ASSESSING VULNERABILITIES ON A MOBILE COMMUNICATIONS DEVICE

(71) Applicant: Lookout, Inc., San Francisco, CA (US)

(72) Inventors: John G. Hering, San Francisco, CA (US); Kevin Mahaffey, San Francisco, CA (US); James Burgess, Alameda, CA (US)

(73) Assignee: LOOKOUT, INC., San Francisco, CA (US)

( * ) Notice: This patent is subject to a terminal disclaimer.

(21) Appl. No.: 15/898,124

(22) Filed: Feb. 15, 2018

Related U.S. Patent Documents

Reissue of:
(64) Patent No.: 8,397,301
Issued: Mar. 12, 2013
Appl. No.: 12/621,431
Filed: Nov. 18, 2009

U.S. Applications:
(63) Continuation of application No. 14/109,725, filed on Dec. 17, 2013, now Pat. No. Re. 46,768, which is an application for the reissue of Pat. No. 8,397,301.

(51) Int. Cl.
*H04L 29/06* (2006.01)
*H04W 12/12* (2009.01)
*G06F 21/57* (2013.01)

(52) U.S. Cl.
CPC ..... *H04L 63/1433* (2013.01); *G06F 21/577* (2013.01); *H04W 12/1208* (2019.01)

(58) Field of Classification Search
CPC ... G06F 21/577; H04L 63/1433; H04W 12/12
(Continued)

(56) References Cited

U.S. PATENT DOCUMENTS 3,416,032 A 12/1968 Jahns et al.
4,553,257 A 11/1985 Mori et al.
(Continued)

FOREIGN PATENT DOCUMENTS

GB 2430588 3/2007
WO 2007081356 7/2001
(Continued)

OTHER PUBLICATIONS

Real world Computing, Jun. 16, 2008 (PC Pro), pp. 1-2.
(Continued)

*Primary Examiner* — Minh Dieu Nguyen
(74) *Attorney, Agent, or Firm* — Dergosits & Noah LLP

(57) ABSTRACT

The invention is a system and method for identifying, assessing, and responding to vulnerabilities on a mobile communication device. Information about the mobile communication device, such as its operating system, firmware version, or software configuration, is transmitted to a server for assessment. The server accesses a data storage storing information about vulnerabilities. Based on the received information, the server may identify those vulnerabilities affecting the mobile communication device, and may transmit a notification to remediate those vulnerabilities. The server may also transmit result information about the vulnerabilities affecting the mobile communication device. The server may also store the received information about the device, so that in the event the server learns of new vulnerabilities, it may continue to assess whether the device is affected, and may accordingly notify or remediate the device. The server may provide an interface for an administrator to manage the system and respond to security issues.

32 Claims, 11 Drawing Sheets

(58) Field of Classification Search
USPC ..... 726/7, 24–25; 455/411, 418–420, 423, 455/432.2, 432.3
See application file for complete search history.

(56) References Cited

U.S. PATENT DOCUMENTS 5,319,776 A 6/1994 Hile et al.
5,574,775 A 11/1996 Miller, II et al.
6,185,689 B1 2/2001 Todd et al.
6,269,456 B1 7/2001 Hodges et al.
6,272,353 B1 8/2001 Dicker et al.
6,301,668 B1 10/2001 Gleichauf et al.
6,453,345 B2 9/2002 Trcka et al.
6,529,143 B2 3/2003 Mikkola et al.
6,792,543 B2 9/2004 Pak et al.
6,907,530 B2 6/2005 Wang
6,959,184 B1 10/2005 Byers et al.
7,020,895 B2 3/2006 Albrecht
7,023,383 B2 4/2006 Stilp et al.
7,069,589 B2 6/2006 Schmall et al.
7,096,006 B2 8/2006 Kouznetsov
7,096,368 B2 8/2006 Kouznetsov
7,123,933 B2 10/2006 Poor et al.
7,127,455 B2 10/2006 Carson et al.
7,171,690 B2 1/2007 Kouznetsov et al.
7,178,166 B1 2/2007 Taylor et al.
7,210,168 B2 4/2007 Hursey et al.
7,228,566 B2 6/2007 Caceres et al.
7,236,598 B2 6/2007 Sheymov et al.
7,237,264 B1 6/2007 Graham et al.
7,266,810 B2 9/2007 Karkare et al.
7,290,276 B2 10/2007 Ogata
7,305,245 B2 12/2007 Alizadeh-Shabdiz et al.
7,308,256 B2 12/2007 Morota et al.
7,308,712 B2 12/2007 Banzhof
7,325,249 B2 1/2008 Sutton et al.
7,325,252 B2 * 1/2008 Bunker ..... H04L 43/00 726/23
7,346,922 B2 * 3/2008 Miliefsky ..... H04L 63/0272 726/11
7,356,835 B2 4/2008 Gancarcik et al.
7,370,345 B2 * 5/2008 Bardsley ..... G06F 21/577 726/11
7,376,969 B1 5/2008 Njemanze et al.
7,386,297 B2 6/2008 An
7,386,883 B2 * 6/2008 Bardsley ..... G06F 21/552 705/51
7,392,043 B2 6/2008 Kouznetsov et al.
7,392,543 B2 6/2008 Szor
7,397,424 B2 7/2008 Houri
7,397,434 B2 7/2008 Mun et al.
7,401,359 B2 7/2008 Gartside et al.
7,403,762 B2 7/2008 Morgan et al.
7,414,988 B2 8/2008 Jones et al.
7,415,270 B2 8/2008 Wilhelmsson et al.
7,433,694 B2 10/2008 Morgan et al.
7,467,206 B2 12/2008 Moore et al.
7,471,954 B2 12/2008 Brachet et al.
7,472,422 B1 12/2008 Agbabian
7,474,897 B2 1/2009 Morgan et al.
7,493,127 B2 2/2009 Morgan et al.
7,502,620 B2 3/2009 Morgan et al.
7,515,578 B2 4/2009 Alizadeh-Shabdiz et al.
7,525,541 B2 4/2009 Chun et al.
7,551,579 B2 6/2009 Alizadeh-Shabdiz et al.
7,551,929 B2 6/2009 Alizadeh-Shabdiz et al.
7,634,800 B2 12/2009 Ide et al.
7,685,132 B2 3/2010 Hyman
7,696,923 B2 4/2010 Houri
7,768,963 B2 8/2010 Alizadeh-Shabdiz
7,769,396 B2 8/2010 Alizadeh-Shabdiz et al.
7,774,637 B1 8/2010 Beddoe et al.
7,809,353 B2 10/2010 Brown et al.
7,818,017 B2 10/2010 Alizadeh-Shabdiz et al.
7,835,754 B2 11/2010 Alizadeh-Shabdiz et al.
7,856,234 B2 12/2010 Alizadeh-Shabdiz et al.
7,856,373 B2 12/2010 Ullah
7,861,303 B2 12/2010 Kouznetsov et al.
7,907,966 B1 3/2011 Mammen
7,916,661 B2 3/2011 Alizadeh-Shabdiz et al.
7,999,742 B2 8/2011 Alizadeh-Shabdiz
8,014,788 B2 9/2011 Alizadeh-Shabdiz et al.
8,019,357 B2 9/2011 Alizadeh-Shabdiz et al.
8,031,657 B2 10/2011 Jones et al.
8,054,219 B2 11/2011 Alizadeh-Shabdiz
8,089,398 B2 1/2012 Alizadeh-Shabdiz
8,089,399 B2 1/2012 Alizadeh-Shabdiz
8,090,386 B2 1/2012 Alizadeh-Shabdiz et al.
8,126,456 B2 2/2012 Lotter et al.
8,127,358 B1 2/2012 Lee
8,458,793 B2 * 6/2013 McKenna ..... G06F 21/55 709/224
2001/0044339 A1 11/2001 Cordero et al.
2002/0042886 A1 4/2002 Lahti et al.
2002/0087483 A1 7/2002 Harif
2002/0108058 A1 8/2002 Iwamura
2002/0183060 A1 12/2002 Ko et al.
2002/0191018 A1 12/2002 Broussard
2003/0028803 A1 2/2003 Bunker et al.
2003/0046134 A1 3/2003 Frolick et al.
2003/0079145 A1 4/2003 Kouznetsov et al.
2003/0115485 A1 6/2003 Milliken
2003/0120951 A1 6/2003 Gartside et al.
2003/0131148 A1 7/2003 Kelley et al.
2004/0022258 A1 2/2004 Tsukada et al.
2004/0025042 A1 2/2004 Kouznetsov et al.
2004/0133624 A1 7/2004 Park
2004/0158741 A1 8/2004 Schneider
2004/0185900 A1 9/2004 McElveen
2004/0225887 A1 11/2004 O'Neil et al.
2004/0259532 A1 12/2004 Isomaki et al.
2005/0010821 A1 1/2005 Cooper et al.
2005/0015443 A1 1/2005 Levine et al.
2005/0074106 A1 4/2005 Orlamunder et al.
2005/0076246 A1 4/2005 Singhal
2005/0091308 A1 4/2005 Bookman et al.
2005/0125779 A1 6/2005 Kelley et al.
2005/0130627 A1 6/2005 Calmels et al.
2005/0138395 A1 6/2005 Benco et al.
2005/0138413 A1 6/2005 Lippmann et al.
2005/0154796 A1 7/2005 Forsyth
2005/0197099 A1 9/2005 Nehushtan
2005/0227669 A1 10/2005 Haparnas
2005/0237970 A1 10/2005 Inoue
2005/0254654 A1 11/2005 Rockwell et al.
2005/0278777 A1 12/2005 Loza
2005/0282533 A1 12/2005 Draluk et al.
2006/0026283 A1 2/2006 Trueba
2006/0073820 A1 4/2006 Craswell et al.
2006/0075388 A1 4/2006 Kelley et al.
2006/0080680 A1 4/2006 Anwar et al.
2006/0095454 A1 5/2006 Shankar et al.
2006/0101517 A1 * 5/2006 Banzhof ..... G06F 21/577 726/25
2006/0101518 A1 * 5/2006 Schumaker et al. ..... 726/25
2006/0130145 A1 6/2006 Choi et al.
2006/0150238 A1 7/2006 D'Agostino
2006/0150256 A1 7/2006 Fanton et al.
2006/0179485 A1 8/2006 Longsine et al.
2006/0218482 A1 9/2006 Ralston et al.
2006/0224742 A1 10/2006 Shahbazi
2006/0253205 A1 11/2006 Gardiner
2006/0253584 A1 11/2006 Dixon et al.
2006/0272011 A1 11/2006 Ide et al.
2006/0277408 A1 12/2006 Bhat et al.
2006/0294582 A1 12/2006 Linsley-Hood et al.
2007/0005327 A1 1/2007 Ferris
2007/0011319 A1 1/2007 McClure et al.
2007/0015519 A1 1/2007 Casey
2007/0016953 A1 1/2007 Morris et al.
2007/0016955 A1 1/2007 Goldberg et al.
2007/0028095 A1 2/2007 Allen et al.
2007/0028303 A1 2/2007 Brennan
2007/0028304 A1 2/2007 Brennan

(56) References Cited

U.S. PATENT DOCUMENTS

| | | | |
|---|---|---|---|
| 2007/0050471 | A1 | 3/2007 | Patel et al. |
| 2007/0086476 | A1 | 4/2007 | Iglesias et al. |
| 2007/0154014 | A1 | 7/2007 | Aissi et al. |
| 2007/0174472 | A1 | 7/2007 | Kulakowski |
| 2007/0186282 | A1 | 8/2007 | Jenkins |
| 2007/0214504 | A1 | 9/2007 | Milani Comparetti et al. |
| 2007/0220608 | A1 | 9/2007 | Lahti et al. |
| 2007/0240218 | A1 | 10/2007 | Tuvell et al. |
| 2007/0240221 | A1 | 10/2007 | Tuvell et al. |
| 2007/0240222 | A1 | 10/2007 | Tuvell et al. |
| 2007/0248047 | A1 | 10/2007 | Shorty et al. |
| 2007/0250627 | A1 | 10/2007 | May et al. |
| 2007/0293263 | A1 | 12/2007 | Eslambolchi et al. |
| 2007/0297610 | A1 | 12/2007 | Chen et al. |
| 2008/0028470 | A1 | 1/2008 | Remington et al. |
| 2008/0046557 | A1 | 2/2008 | Cheng |
| 2008/0047007 | A1 | 2/2008 | Satkunanathan et al. |
| 2008/0065507 | A1 | 3/2008 | Morrison et al. |
| 2008/0070495 | A1 | 3/2008 | Stricklen et al. |
| 2008/0072329 | A1 | 3/2008 | Herschaft |
| 2008/0086773 | A1 | 4/2008 | Tuvell et al. |
| 2008/0086776 | A1 | 4/2008 | Tuvell et al. |
| 2008/0109871 | A1 | 5/2008 | Jacobs |
| 2008/0127171 | A1 | 5/2008 | Tarassov |
| 2008/0127179 | A1 | 5/2008 | Moss et al. |
| 2008/0127334 | A1 | 5/2008 | Gassoway |
| 2008/0127336 | A1 | 5/2008 | Sun et al. |
| 2008/0132218 | A1 | 6/2008 | Samson et al. |
| 2008/0134281 | A1 | 6/2008 | Shinde et al. |
| 2008/0140767 | A1 | 6/2008 | Rao et al. |
| 2008/0148381 | A1 | 6/2008 | Aaron |
| 2008/0172746 | A1 | 7/2008 | Lotter et al. |
| 2008/0178294 | A1 | 7/2008 | Hu et al. |
| 2008/0181116 | A1 | 7/2008 | Kavanaugh et al. |
| 2008/0196104 | A1 | 8/2008 | Tuvell et al. |
| 2008/0200160 | A1 | 8/2008 | Fitzpatrick et al. |
| 2008/0208950 | A1 | 8/2008 | Kim et al. |
| 2008/0209557 | A1 | 8/2008 | Herley et al. |
| 2008/0235801 | A1 | 9/2008 | Soderberg et al. |
| 2008/0276111 | A1 | 11/2008 | Jacoby et al. |
| 2008/0293396 | A1 | 11/2008 | Barnes et al. |
| 2008/0318562 | A1 | 12/2008 | Featherstone et al. |
| 2009/0199298 | A1 | 8/2009 | Miliefsky |
| 2009/0205047 | A1* | 8/2009 | Podjarny ..... 726/25 |
| 2009/0248623 | A1 | 10/2009 | Adelman et al. |
| 2009/0293125 | A1 | 11/2009 | Szor |
| 2010/0064341 | A1 | 3/2010 | Aldera |
| 2010/0100939 | A1 | 4/2010 | Mahaffey et al. |
| 2010/0100963 | A1 | 4/2010 | Mahaffey |
| 2010/0154032 | A1 | 6/2010 | Ollmann |
| 2010/0313270 | A1 | 12/2010 | Kim et al. |
| 2010/0332593 | A1 | 12/2010 | Barash et al. |

FOREIGN PATENT DOCUMENTS

| | | |
|---|---|---|
| WO | 2005101789 | 10/2005 |
| WO | WO2005101789 | 10/2005 |
| WO | 2006110181 | 10/2006 |
| WO | 2008007111 | 1/2008 |
| WO | 2008057737 | 5/2008 |

OTHER PUBLICATIONS

Simone, "Playing with ActiveMQ," Mostly Useless, Dec. 27, 2007, available at <http://www.mostly-useless.com/blog/2007/12/27/playing-with-activemq/>, retrieved Mar. 30, 2012, 6 pages.
Trillian, available at <http://www.trillian.im/>, retrieved Sep. 14, 2011, 24 pages.
U.S. Appl. No. 13/033,025; Prosecution history available via USPTO. Filed Feb. 23, 2011.
U.S. Appl. No. 13/212,055; Prosecution history available via USPTO. Filed Aug. 17, 2011.
U.S. Appl. No. 12/255,632, filed Oct. 21, 2008.
U.S. Appl. No. 12/372,719, filed Feb. 17, 2009.
U.S. Appl. No. 12/621,431, filed Nov. 18, 2009.
U.S. Appl. No. 12/868,669, filed Aug. 25, 2010.
U.S. Appl. No. 12/868,672, filed Aug. 25, 2010.
U.S. Appl. No. 12/868,676, filed Aug. 25, 2010.
U.S. Appl. No. 12/876,018, filed Sep. 3, 2010.
U.S. Appl. No. 13/160,382, filed Jun. 14, 2011.
U.S. Appl. No. 13/160,447, filed Jun. 14, 2011.
U.S. Appl. No. 13/162,477, filed Jun. 16, 2011.
U.S. Appl. No. 13/267,731, filed Oct. 6, 2011.
Virus Total, VT Community, www.virustotal.com/index.html; Dated Dec. 16, 2011; 44 Pages.
U.S. Appl. No. 12/255,635. Prosecution history available via USPTO (including Office Action dated Mar. 24. 2011).
U.S. Appl. No 12/255,632. Prosecution history available via USPTO (including Office Action dated Apr. 13, 2011).
U.S. Appl. No. 12/255,626. Prosecution history available via USPTO (including Office Action dated Feb. 1, 2011).
U.S. Appl. No. 12/255,621. Prosecution history available via USPTO (including Office Action dated Apr. 13, 2011).
McAfee, Internet Archive, Way Back Machine, available at <http://web.archive.org/web/20080517102505/www.mcafeesecure.com/us/technology-intro.jsp>, retrieved Feb. 23, 2011, 2 pages.
Qualys, "Executive Dashbard," Internet Archive, Way Back Machine, available at <http://web.archive.org/web/20080507161417/ www.qualys.com/products/screens/?screen=Executive + Dashboard>, retrieved Feb. 23, 2011, 1 page.
Qualys, "Vulnerability Management," Internet Archive, Way Back Machine, available at <http://web.archive.org/web/20080611095201/www.qualys.com/solutions/vulnerability_management> retrieved Feb. 24, 2011, 1 page.
Ten, Joe, "Norton 360 Version 3.0 Review," Mar. 9, 2009, available at <http://techielobang.com/blog/2009/03/09/norton-360-version-30-review/> retrieved Feb. 23, 2011, 12 pages.
Windows Update, Internet Archive, Way Back Machine, available at <http://web.archive.org/web/20071022193017/http://en.wikipedia.org/wiki/Windows_Update> retrieved Feb. 23, 2011, 3 pages.
U.S. Appl. No. 12/255,614. Prosecution history available via USPTO (including Office Action dated Apr. 14, 2011).
Richardson, Alexis "Introduction to RabbitMQ," Google UK, Sep. 25, 2008, available at <http://www.rabbitmq.com/resources/google-tech-talk-final/alexis-google-rabbitmq-talk.pdf>, retrieved Mar. 30, 2012, 33 pages.
Fisher, Oliver "Malware? We Don't Need No Stinking Malwarel," Google, Oct. 24, 2008, available at <http://googlewebmastercentral.blogspot.com/2008/10/malware-we-dont-need-no-stinking.html>, retrieved Mar. 30, 2012, 11 pages.
Reardon, Marguerite "Mobile Phones That Track Your Buddies," Cnet, Nov. 14, 2006, available at <http://news.cnet.com/Mobile-phones-that-track-your-buddies/2100-1039_3-6135209.html>, retrieved Mar. 30, 2012, 4 pages.
Fette, Ian "Understanding Phishing and Malware Protection in Google Chrome," the Chromium Blog, Nov. 14, 2008, available at <http://blog_chrounium_org/2008/11/understanding-phishing-and-malware.htm>, retrieved May 17, 2011, 6 pages.
Kincaid, Jason "Urban Airship Brings Easy Push Notifications to Android," TechCrunch, Aug. 10, 2010, available at.<http://techcrunch.com/2010/08/10/urban-airship-brings-easy-push-notifications-to-android/>, retrieved Jun. 16, 2011, 5 pages.
Keane, Justin K. "Using the Google Safe Browsing API from PHP," Mad Irish, Aug. 7, 2009, available at <http://www.madirish.net/node/245>, retrieved Mar. 30, 2012, 5 pages.
Jefferies, Charles P. "Webroot AntiVirus 2010 With Spy Sweeper Review," Notebook Review, Jun. 22, 2010,.available at <http://http://www._notebookreview.com/default.asp?newsID=5700&review=Webroot+AntiVirus+2010+With+Spy+Sweeper+Review>, retrieved May 18, 2011, 3 pages.
"Berry Locator", 2007, Mobireport LLC, 1 page.
"Firefox", Wikipedia, Jul. 20, 2011, available at <http://en.wikipedia.org/wiki/firefox> Retrieved Aug. 10, 2011, 37 Pages.
"F-Secure Mobile Security for S60 Users Guide", F-Secure Corporation 2009, pp. 1-34.

(56) References Cited

OTHER PUBLICATIONS

"Java Virtual Machine", Wikipedia, Aug. 7, 2011, Available at <http://en.wikipedia.org/wikilJava_Virtual_Machine> Retrieved Aug. 10, 2011, 7 pages.
"Kaspersky Mobile Security", Kaspersky Lab 1997-2007, 1 page.
"Kaspersky Mobile Security", Kaspersky Lab 2008, available at <http://www.kaspersky.com/ kaspersky_mobile_security> Retrieved Sep. 11, 2008, 2 Pages.
"Norton Smartphone Security", Symantec, 2007, Available at <http://www.symantec.com/norton/smartphone-security> Retrieved Oct. 21, 2008, 2 pages.
"PhoneBak PDA Phone Anti-theft software for your PDA phone", 2007, Bak2u Pte Ltd (Singapore) pp. 1-4.
"PhoneBak: Mobile Phone Theft Recovery Software", 2007, Westin Tech.
"Symantec Endpoint Protection", Symantec, 2008, Available at <http://www.symantec.com/business/products/family.jsp?familyid=endpointsecurity>, 6 pages.
"Symantec Mobile Security Suite for Windows Mobile", Symantec, 2008 Available at <http://www.symantec.com/ business/products/sysreq.jsp?pcid=2241&pvid=mobile_security_suite_1>, 5 pages.
"TippingPoint Security Management System (SMS)", TippingPoint, Available at <http://www.tippingpoint.com/ products_sms.html>, 2 pages.
Summerson, Cameron "5 Android Antivirus Apps Compared, Find Out Which Ones Are Worth Having!," Android Headlines, Mar. 8, 2011, available at <http://androidheadlines.com/2011/03/5-android-antivirus-apps-comapred-findout-which-ones-are-worth-having.html>, retrieved Mar. 30, 2012, 9 pages.
"Android Cloud to Device Messaging Framework," Google Code Labs, available at <http://code.google.com/android/c2dm/>, retrieved Sep. 14, 2011, 9 pages.
"BlackBerry Push Service Overview," Dec. 16, 2009, available at <http://us.blackberry.com/developers/platform/.pushapi.jsp#tab_tab_resources>, retrieved Sep. 14, 2011, 21 pages.
"eSoft unveils SiteFilter 3.0 for OEMs," Infosecurity, Mar. 23, 2010, available at <http://www.infosecurity-magazine.com/view/82731esoft-unveils-sitefilter-30-for-oems/>.
"Get the Physical Location of Wireless Router From its MAC Address (BSSID)," Coderrr, Sep. 10, 2008, available at<http://codermwordpress.com/2008/09/10/get-the-physical-location-of-wireless-router-from-its-mac-address-bssidt>, retrieved Mar. 30, 2012, 13 pages.
"Hooking—Wikipedia, the Free Encyclopedia," Internet Archive Wayback Machine, Apr. 13, 2010, available at <http://web.archive.org/web/20100415154752/http://en.wikipedia.org/wiki/Hooking>, retrieved Mar. 30, 2012, 6 pages.
Mytton, David "How to Build an Apple Push Notification Provider Server (Tutorial)," Server Density, Jul. 10, 2009,.available at <http://blog.serverdensity.com/2009/07/10/how-to-build-an-apple-push-notification-provider-server-tutorial/ >, retrieved Apr. 2, 2012, 33 pages.
"Pidgin the Universal Chat Client," Pidign, available at <http://www.pidgin.im/>, retrieved Sep. 14, 2011, 14 pages.
Pogue, David "Simplifying the Lives of Web Users," the New York Times, Aug. 18, 2010, available at <http://www.nytimes.com/2010108/19/technology/personaltech119pogue.html>, retrieved May 17, 2011, 5 pages.
"Twilio Cloud Communications Web Service Api for Building Voice and Sms Applications," Twilio available at <http://.www.twilio.com>, retrieved Sep. 14, 2011, 12 pages.
"Understanding Direct Push," Microsoft, Feb. 18, 2009, available at <http://technet.microsoft.com/en-us/library/.aa997252(v=exchg.80).aspx>, retrieved Mar. 30, 2012, 3 pages.
"Urban Airship: Powering Modern Mobile," available at <http://urbanairship.com/products/>, retrieved Sep. 16, 2011, 14 pages.
"zVeloDB URL Database," zVelo, available at <https:/Izvelo.com/technology/zvelodb-url-database>, retrieved Mar. 30, 2012, 2 pages.
U.S. Appl. No. 11/397,521.
U.S. Appl. No. 13/284,248.
U.S. Appl. No. 13/313,937.
U.S. Appl. No. 13/314,032.
U.S. Appl. No. 13/333,654.
U.S. Appl. No. 13/335,779.
U.S. Appl. No. 13/410,979.
Amazon.com: Mining the Web Discovering Knowledge from Hypertext Data (9781558607545): Soumen Chakrabarti: Books, Amazon available at <http://www.amazon.com/exec/obidos/Asin/1558607544/>, retrieved Jun. 7, 2012, pp. 1-7.
Clickatell, available at <http://www.clickatell.com>, retrieved Sep. 14, 2011, 11 pages.
Dolcourt, Jessica; Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.
Diligenti, M., et al., Focused Crawling Using Context Graphs:, Proceedings of the 26th VLDB Conference, Cairo, Egypt, 2000, pp. 1-8.
Grafio "Stay Secure", Opera Software, Sep. 29, 2008, Available at <http://widgets.opera.com/widget/4495> Retrieved Oct. 21, 2008, 4 pages.
MobileWipe web page, pp. 1-4.
PagerDuty, available at <http://www.pagerduty.com>, retrieved Sep. 14, 2011, 23 pages.
PCT International Search Report and Written Opinion of the International Searching Authority for PCT/US2009/061370; Mailed on Dec. 14, 2009; pp. 1-12.
PCT International Search Report and Written Opinion of the International Searching Authority for PCT/US2009/061372; Mailed on Mar. 24, 2010; pp. 1-16.
PCT International Search Report and Written Opinion of the International Searching Authority for PCT/US2011/049182; Mailed on Dec. 23, 2011; pp. 1-11.
Prey, available at <http://preyproject.com/>, retrieved Jan. 10, 2012, 4 pages.

* cited by examiner

SYSTEM AND METHOD FOR IDENTIFYING AND ASSESSING VULNERABILITIES ON A MOBILE COMMUNICATIONS DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is an application for reissue of U.S. Pat. No. 8,397,301 B2, and is a continuation of application Ser. No. 14/109,725, which is also an application for reissue of U.S. Pat. No. 8,397,301 B2.*

FIELD

The invention relates generally to mobile security, and specifically, to assessing the vulnerability of a mobile communication device.

BACKGROUND

Mobile communication devices or mobile devices, such as cellular telephones, smartphones, wireless-enabled personal data assistants, and the like, are becoming more popular as cellular and wireless network providers are able to expand coverage and increase bandwidth. Mobile devices have evolved beyond providing simple telephone functionality and are now highly complex multifunctional devices with capabilities rivaling those of desktop or laptop computers. In addition to voice communications, many mobile devices are capable of text messaging, e-mail communications, internet access, and the ability to run full-featured application software. Mobile devices can use these capabilities to perform online transactions such as banking, stock trading, payments, and other financial activities. Furthermore, a mobile device used by an individual, a business, or a government agency can often store confidential or private information in forms such as electronic documents, text messages, access codes, passwords, account numbers, e-mail addresses, personal communications, phone numbers, and financial information.

In turn, it is more important to protect those devices against malware, malicious attacks and other exploits. Specifically, it would be helpful to be able to identify vulnerabilities for a mobile communication device, so that the user of the mobile communication device can be alerted if his or her device suffers from any exploitable weaknesses. It is also important for an organization that relies on mobile devices to understand the state of their security and be able to respond to vulnerabilities on mobile devices in an efficient and effective manner.

Presently, current solutions for assessing the vulnerabilities of a computer on a network focus on a conventional desktop, laptop, server, or other computing devices that often enjoy more processing power and memory than a mobile communication device and generally have less restricted application environments than a mobile communication device. As such, these computing devices can often include local monitoring services that can run in the background without overly taxing valuable computing resources. In addition, conventional computing devices are often consistently tethered to a particular local network, such that devices can be remotely scanned over the local network for security weaknesses. Mobile communication devices, on the other hand, are often connected to public networks and switch between networks and network types, making remote, network-based security scans undesirable.

What is therefore needed is a way to provide similar protective services for mobile communication devices in a manner that does not overly tax resources on the mobile communication device, and that extends protective services even when the mobile communication device is not connected to a particular network or is not connected to any network.

There are many differences between mobile communication devices (e.g. operating systems, hardware capabilities, software configurations) that make it difficult to have a single system for accurately assessing the vulnerability of multiple types of devices. Additionally, many mobile communication devices are able to accept installation of various third-party software applications or "apps" that have been developed to extend the capabilities of the device. The installation of apps can alter the vulnerability state of a device, since each app may alter how and with which networks the mobile device communicates. What is therefore needed is a way to assess vulnerabilities of a mobile communication device that accounts for differences such as the operating system, the make, model, configuration, or any installed software on the mobile device. Also needed is a way for a user or administrator to view the security status of, remediate, and otherwise assess and manage the security of multiple different mobile communication devices.

BRIEF DESCRIPTION OF THE FIGURES

The invention is illustrated by way of example and not limitation in the figures of the accompanying drawings, in which like references indicate similar elements, and in which.

DETAILED DESCRIPTION

Figure 1:
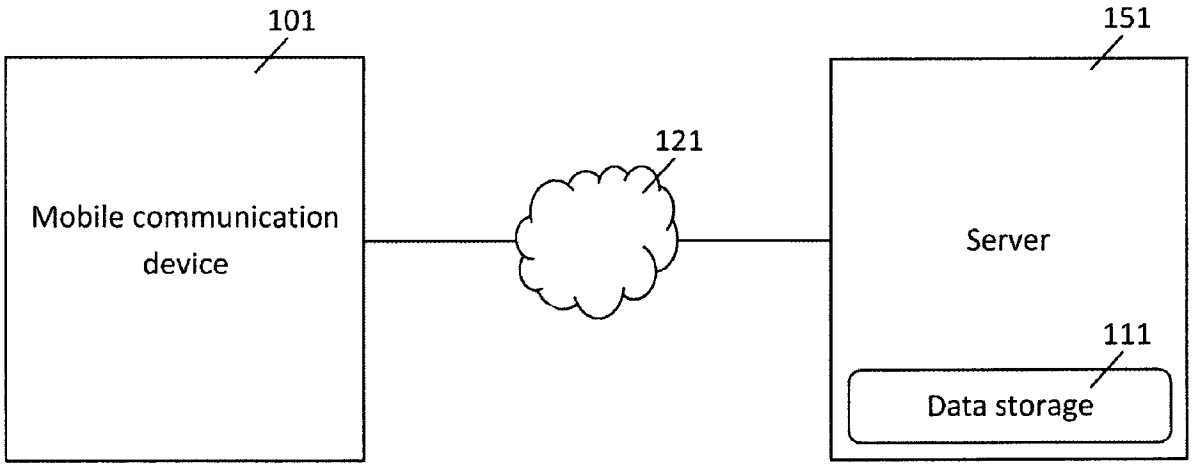
FIG. 1 is an exemplary block diagram depicting an embodiment of the invention.

The invention is a system and a method for identifying, assessing, and responding to vulnerabilities on or affecting a mobile communication device. As will be discussed further below, a mobile communication device may transmit certain information to a server, and the server may transmit certain result information to the device that contains an assessment or identifies known or potential vulnerabilities affecting the device. Additionally or alternatively, the server may transmit notifications about possible or actual vulnerabilities affecting a mobile communication device, which may include instructions for remediating any vulnerabilities identified as affecting the mobile communication device. Furthermore, the server may host a management console that allows an administrator to view the security status of multiple mobile communication devices and take action to secure them if necessary.

It should be appreciated that the invention can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein. One will appreciate that the mobile communication device described herein may include any computer or computing device running an operating system for use on handheld or mobile devices, such as smartphones, PDAs, mobile phones and the like. For example, a mobile communication device may include devices such as the Apple iPhone®, the Palm Pre™, or any device running the Android™ OS, Symbian OS®, Windows Mobile® OS, Palm OS® or Palm Web OS™.

In the context of this document, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer readable instructions may be referred to as components or modules. Applications may be hardwired or hard coded in hardware or take the form of software executing on a general purpose computer such that when the software is loaded into and/or executed by the computer, the computer becomes an apparatus for practicing the invention. Applications may also be downloaded in whole or in part through the use of a software development kit or toolkit that enables the creation and implementation of the invention. In this specification, these implementations, or any other form that the invention may take, may be referred to as techniques. In general, the order of the steps of disclosed processes may be altered within the scope of the invention.

FIG. 1 is a block diagram illustrating an embodiment of a system for identifying and assessing vulnerabilities on a mobile communication device. In an embodiment, the system may include one or more mobile communication devices 101 connected on a cellular, wireless Internet or other network 121. One or more servers 151 may also have access to network 121. The one or more servers 151 may receive one or more sets of vulnerability identification information from the one or more mobile communication devices 101, and/or may transmit one or more sets of result information to the one or more mobile communication devices 101. In addition, the one or more servers 151 may have access to a data storage 111 that stores information about mobile communication device vulnerabilities. One will appreciate that data storage 111 may be a database, data table, file system or other memory store. Data storage 111 may be hosted on any of the one or more servers 151, or may exist externally from the one or more servers 151, so long as the one or more servers 151 have access to data storage 111. One will also appreciate that the configuration of the system illustrated in FIG. 1 is merely exemplary, and that other configurations are possible without departing from this disclosure or the scope of the invention. For example, servers 151 or data storage 111 may be singular or plural, or may be physical or virtualized.

One will appreciate that communication between mobile communication device 101 and server 151 may utilize a variety of networking protocols and security measures. In an embodiment, server 151 operates as an HTTP server and the device 101 operates as an HTTP client. To secure the data in transit, mobile communication device 101 and server 151 may use Transaction Layer Security ("TLS"). Additionally, to ensure that mobile communication device 101 has authority to access server 151, and/or to verify the identity of mobile communication device 101, device 101 may send one or more authentication credentials to server 151. For example, authentication credentials may include a username and password or any other data that identifies mobile communication device 101 to server 151. Authentication may allow server 151 to store specific information, such as vulnerability identification information, about mobile communication device 101, and may also provide a persistent view of the security status of mobile communication device 101.

As previously mentioned, data storage 111 may be used to store sets of information about mobile communication device vulnerabilities ("vulnerability information"), which may be transmitted in whole or in part to one or more mobile communication devices in the form of "result information." As used herein, a vulnerability may include an exploitable weakness on a mobile communication device that may result from the device hardware or software. Vulnerabilities may arise due to weaknesses in the device's operating system, other software or hardware flaws in the device, protocol implementation or specification flaws, misconfiguration of the device, software applications installed or stored on the device, or services provided through, to or by the device. Vulnerabilities may arise form the features of the device, such as from the presence of Bluetooth, infrared or Internet capabilities on the device, or other communication interfaces and protocols available on the device. Vulnerabilities may arise from weaknesses in the device's interaction with, flaws in, or misconfiguration of other services and systems such as text messaging, voice mail, telephony, or other services and systems accessed through a mobile communication device. Information about a vulnerability, i.e., vulnerability information, may be stored in data storage 111 and accessed by server 151 or mobile communication device 101. Data storage 111 may store general information about mobile communication device vulnerabilities, or may store information about vulnerabilities specific to a mobile communication device. As will be discussed further below, sets of vulnerability information corresponding to vulnerabilities that could affect or actually affect the mobile communication device may be transmitted in the form of result information, notifications, or both.

One will appreciate that as used herein, vulnerability information may include the name, description, severity rating, security impact summary and remediation instructions for a vulnerability. Vulnerability information may be included in the result information server 151 transmits to mobile communication device 101 or may be stored in data storage 111. Result information may include a list of vulnerabilities that are known to affect mobile communication device 101, a list of potential vulnerabilities that may affect mobile communication device 101, and a list of vulnerabilities that are known not to affect mobile communication device 101. Each entry in a list of vulnerabilities may include some or all of the set of vulnerability information for a vulnerability. As will be discussed in more detail below, the result information may also include a binary assessment of mobile communication device 101 (e.g., good or bad, "okay" or "not okay"), a threat score, remediation instructions for known or potential vulnerabilities, or may instruct display of a graduated icon that changes depending upon state (a sad face for a vulnerable mobile communication device, to a happy face for a "safe" mobile communication device). Vulnerability information may include criteria for determining if a mobile communication device 101 is affected. In an embodiment, vulnerability information may include information about a vulnerability such as a title, a description, a security impact summary, human or computer readable remediation instructions or a severity rating for the vulnerability.

As used herein, "vulnerability identification information" or "identification information" includes data that server 151 may use to determine if mobile communication device 101 is susceptible to any vulnerabilities. Such vulnerability identification information may include the operating system and version for mobile communication device 101; the firmware version of the mobile communication device 101, the device model for mobile communication device 101; carrier information for mobile communication device 101; authentication information; and/or user information for the user of mobile communication device 101. Vulnerability identification information may also include a list of files, software components, libraries and/or a list of the applications or other software installed on mobile communication device 101, as well as other information related to these applications and software such as version and configuration information, configuration information about the mobile communication device 101, communications interfaces and protocols in use by mobile communication device 101 (e.g., WiFi, Bluetooth, IR, SMS, MMS), cellular network information, cellular carrier information, the make and model of mobile communication device 101, and the like.

In an embodiment, vulnerability information stored in data storage 111 may have associated information that includes a description, a title, an overview of the security impact, remediation instructions, and criteria for affected firmware versions. In an embodiment, mobile communication device 101 sends vulnerability identification information to server 151 that includes the device's firmware version. Server 151 may utilize data storage 111 to examine the vulnerability information stored therein and determine if the firmware version for mobile communication device 101 matches the firmware version criteria for any vulnerabilities. If any vulnerabilities match, server 151 may determine that mobile communication device 101 is vulnerable. Server 151 may then transmit result information to the mobile communication device 101, as described herein and shown in the Figures. In an embodiment, server 151 only transmits result information corresponding to vulnerabilities that affect mobile communication device 101. In an embodiment, server 151 transmits result information for all vulnerabilities that may affect device 101. In an embodiment, server 151 transmits result information which contains all vulnerabilities that may affect device 101 and which of those vulnerabilities actually do affect device 101. In an embodiment, the firmware version criteria for being affected by a vulnerability includes the version of the firmware in which the vulnerability was fixed. One will appreciate that some vulnerabilities may only affect certain firmware versions, and that once firmware has been updated to a new version, some vulnerabilities which affected previous versions may no longer be of issue. In order to account for variations in firmware, server 151 may detect and transmit information for vulnerabilities regardless of the firmware version on mobile communication device 101, thereby adding extra precautions. Alternatively, server 151 may only send result information for those vulnerabilities that affect the version of firmware installed on mobile communication device 101, thereby being more specific.

For example, a certain vulnerability may affect a mobile communication device having firmware version 1.0, but not a mobile communication device with firmware version 2.0. Server 151 may receive information about the firmware version of mobile communication device 101, and if the firmware version is earlier than version 2.0, then mobile communication device 101 is determined to be susceptible to the certain vulnerability. However, if the firmware version for mobile communication device 101 is 2.0 or higher, then mobile communication device 101 may not be susceptible to the certain vulnerability. One will appreciate that other variations are possible, and that the determination of whether to send more or less result information may be a setting specified by an administrator, or may involve the application of logic depending upon the severity of the vulnerability and the risks or benefits of transmitting an overabundance of result information to mobile communication device 101. One will also appreciate that the amount of result information to transmit to mobile communication device 101 may also depend upon the capabilities of mobile communication device 101 or the bandwidth of the network.

In an embodiment, data storage 111 stores vulnerability information for at least two types of mobile devices 101. The two mobile device types may have different operating systems, firmware versions, model numbers, carrier information, authentication information, user information, configuration information, states, software applications, and the like. As a result, the vulnerability identification information for each of the at least two mobile devices will differ in some aspect. As such, in an embodiment, data storage 111 may store vulnerability information for vulnerabilities that may affect both of the two device types, including vulnerabilities that may affect one device type but not the other. One will appreciate that data storage 111 may store vulnerability information for a variety of mobile communication devices, and will be able to provide information that will help identify, assess and remediate vulnerabilities for a variety of mobile communication devices.

When data storage 111 stores information about vulnerabilities that may affect multiple types of mobile communication devices, it is important that the transmitted result information not include information regarding vulnerabilities that as a user may perceive as irrelevant to a particular device. As such it is important that the list of vulnerabilities that may affect a device not simply include all vulnerabilities stored by data storage 111. In an embodiment, a vulnerability may affect a device if the device's vulnerability identification information at least partially matches the vulnerability's criteria for affecting a device. Providing partially matching result information provides a conservative, or safer approach to detecting and identifying potential vulnerabilities, as it may provide a opportunity for further assessment and action (e.g. further analysis conducted by software on a device), rather than only providing full criteria matches.

In an embodiment, the partial match includes criteria related to a device that does not change, is unlikely to change, or is irrespective of particular software versions, firmware versions, updates, and configuration. Such criteria may include the device's operating system, model, carrier, software applications installed, hardware capabilities, and the like. For example, data storage 111 may store information about a vulnerability that affects a particular range of firmware versions of the Apple iPhone® OS. This vulnerability information may include criteria that it affects the Apple iPhone® OS and criteria that it affects specific firmware ranges of various device models. In an embodiment, the server 151 determines that the vulnerability does affect all devices running Apple iPhone® OS that match the vulnerability information's firmware version criteria, the vulnerability may affect devices running any firmware version containing Apple iPhone® OS, and the vulnerability may not affect any devices running Android™, Windows Mobile®, Symbian OS®, or other operating systems. One will appreciate that other methods of determining what vulnerabilities stored by data storage 111 may affect a device may be performed without departing from the scope of this disclosure.

FIGS. 2-10 are exemplary flow diagrams depicting various process embodiments. One will appreciate that the following figures and processes are merely exemplary, and that the invention may perform other processes without departing from the scope of this disclosure. One will also appreciate that unless otherwise stated, the performance of the steps in the disclosed processes are not constrained by time. The time between two successive steps may differ from the time between two other successive steps. Additionally, the time to perform each step may differ each time a step is performed. One will also appreciate that the amount of information as described herein is referred to as a "set of information" or a plurality of sets of information. A set of information may include at least one quanta, data point or other quantifiable amount of information, but is not designed to limit or constrain the amount of information discussed herein. In an embodiment, a set of vulnerability information may include multiple pieces of information that relate to a given vulnerability, such as a title, a description, a threat rating, and criteria for the vulnerability to affect a device. In an embodiment, a set of result information may include a security status for a device, and a list of vulnerabilities that the device is vulnerable to, each entry in the list comprising a set of vulnerability information.

Figure 2:
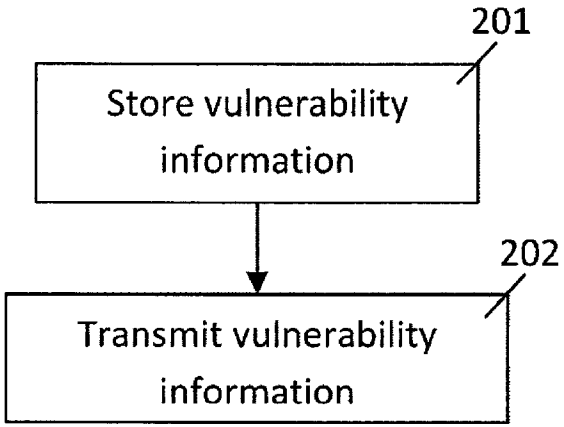
FIG. 2 is an exemplary flow diagram illustrating the steps of an embodiment of the invention.

FIG. 2 depicts and embodiment in which vulnerability information is transmitted to mobile communication device 101. In block 201, data storage 111 stores a plurality of sets of vulnerability information related to one or more mobile communication devices 101. In block 202, vulnerability information is transmitted to at least one mobile communication device 101 over network 121. One will appreciate that the transmission of vulnerability information to the at least one mobile communication device 101 may be controlled by server 151 having access to data storage 111. One will also appreciate that in block 202, the transmitted vulnerability information may also be termed result information.

Figure 3:
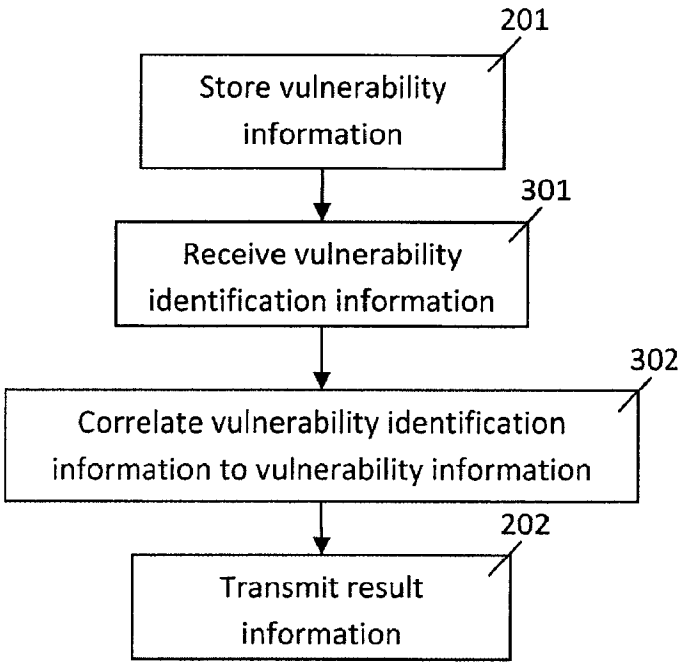
FIG. 3 is an exemplary flow diagram illustrating the steps of an embodiment of the invention.

FIG. 3 depicts an embodiment in which result information is transmitted to mobile communication device 101 after server 151 receives vulnerability identification information from mobile communication device 101. One will appreciate that the process illustrated in FIG. 3 and described herein may be performed in addition to any of the processes disclosed herein, or may be performed separately from any of the processes disclosed herein. In block 201, data storage 111 stores a plurality of sets of vulnerability information related to one or more mobile communication devices 101. In block 301, server 151 receives vulnerability identification information from at least one mobile communication device 101. In block 302, server 151 correlates the received set of vulnerability identification information to at least one of the plurality of sets of vulnerability information to generate a set of result information which contains information about vulnerabilities that affect or may affect the at least one mobile communication device 101. This may include accessing data storage 111 by server 151. In block 202, result information is transmitted to at least one mobile communication device 101 over network 121.

In an embodiment, the scope or type of result information transmitted by server 151 may be general information, or may be specific information about vulnerabilities that may specifically affect mobile communication device 101. As such, the result information transmitted to device 101 may include all of the vulnerability information stored in data storage 111, or may include a subset of all of the vulnerability information stored in data storage 111. The option to transmit general or specific result information may be an option set by an administrator, may depend upon the hardware or software constraints of the mobile communication device, or may depend upon the bandwidth of the network connecting server 151 to mobile communication device 101.

In an embodiment, determining which vulnerabilities specifically affect mobile communication device 101 may involve correlating the vulnerability identification information provided by mobile communication device 101 to the vulnerability information available to server 151. As used herein, "correlating" vulnerability identification information to vulnerability information may involve determining whether the vulnerability described by the vulnerability information affects a device, whether it may affect a device, or whether it does not affect a device. Determinations may be made through a variety of methods, including matching vulnerability identification information with vulnerability information and determining whether identification information satisfies one or more criteria for vulnerability. Correlating may be performed by server 151 and/or data storage 111, and may include applying logic, comparing operating systems, comparing version identifiers, checking for the presence of specific software or other data on the mobile communication device, and the like. In an embodiment, correlating may utilize an identification of the hardware or specifications of the mobile communication device. In an embodiment, correlating may also be performed by mobile device 101.

Figure 4:
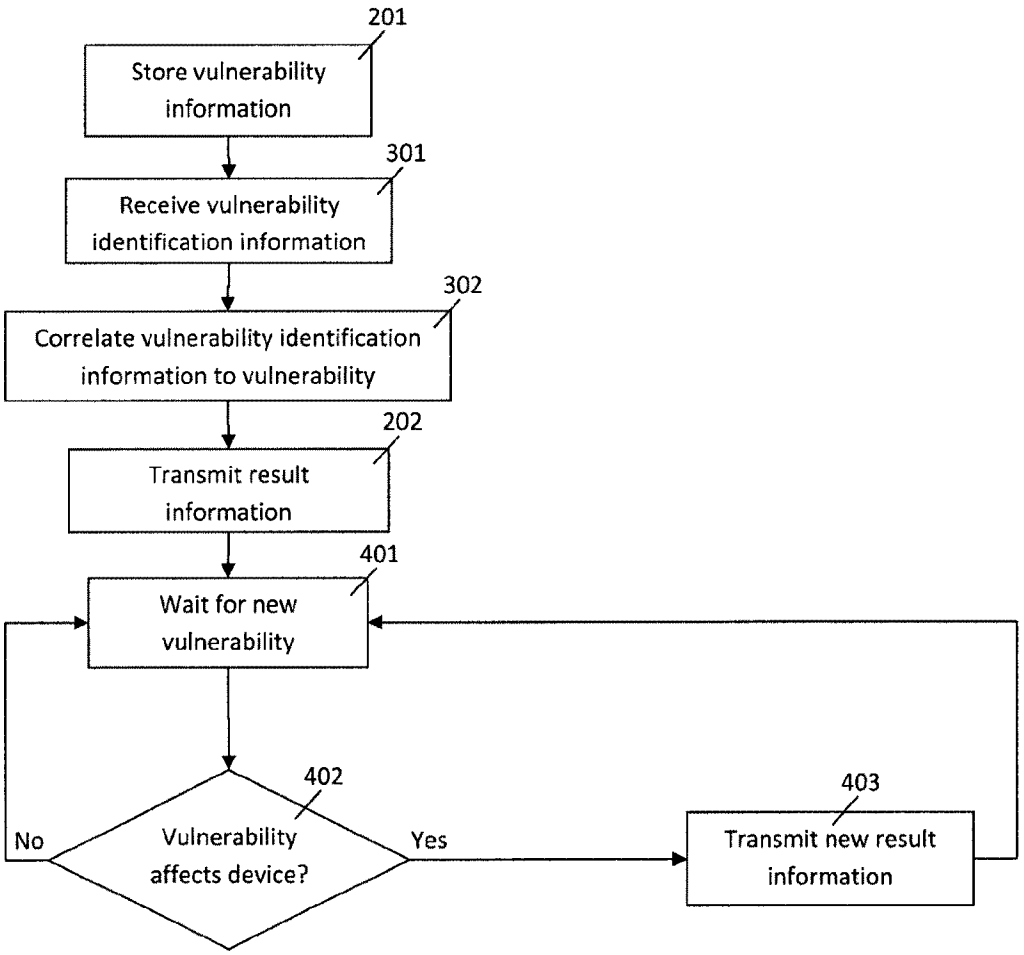
FIG. 4 is an exemplary flow diagram illustrating the steps of an embodiment of the invention.

FIG. 4 is directed to a process in which data storage 111 is updated with new vulnerability information that may be transmitted as a new or second set of result information to affected mobile communication devices 101. As will discussed in more detail below, this process may include the transmission of one or more notifications. One will appreciate that the process illustrated in FIG. 4 and described herein may be performed in addition to any of the processes disclosed herein, or may be performed separately from any of the processes disclosed herein. In block 201 of FIG. 4, data storage 111 stores a plurality of sets of vulnerability information related to one or more mobile communication devices 101. In block 301 of FIG. 4, server 151 receives identification information for one of the one or more mobile communication devices 101. In an embodiment, server 151 stores this identification information in data storage 111. This stored information may be used in block 402 (discussed below) to determine if a newly received vulnerability affects devices 101. In an embodiment, the data is used to present a status or administrative interface for the device. One will appreciate that storing vulnerability identification received by server 151 may apply to the other processes as well. For example, any time server 151 receives vulnerability identification information, the server 151 may store the information for use in generating and transmitting user interfaces (e.g. web interfaces) or identifying whether a vulnerability affects a device 101 while the device 101 is not connected to server 151.

In block 302 of FIG. 4, server 151 performs a correlating step to identify vulnerabilities that affect or may affect the mobile communication device 101, which may include accessing data storage 111 by server 151. As a result of correlating step in block 302, server 151 may generate a set of result information. In block 202 of FIG. 4, the set of result information is transmitted to the affected mobile communication device 101 over network 121. In block 401, server 151 or data storage 111 waits for and receives new vulnerability information. One will appreciate that there may not be a set time interval as to when block 401 is performed. After new vulnerability information is received, server 151 makes a determination whether the newly received vulnerability information affects any known mobile communication device 101 having access to server 151 or data storage 111 (block 402). In an embodiment, the determination in block 402 may use the same method for determining if a vulnerability affects a device 101 as in the correlating block 302; however, instead of identifying which vulnerabilities affect a given device 101, the server 151 may identify which devices 101 are affected by the newly received vulnerability. In an embodiment, the server 151 determines which devices are vulnerable to the newly received vulnerability by correlating vulnerability identification information for each device stored in data storage 111 to the vulnerability criteria for the newly received vulnerability. If the new vulnerability information does affect any of the mobile communication devices 101 having access to server 151 or data storage 111, then in block 403, server 151 transmits a notification of the new vulnerability or transmits information about the new vulnerability to the affected mobile communication devices 101. If the new vulnerability information does not affect any of the mobile communication devices 101 having access to server 151 or data storage 111, then server 151 or data storage 111 will wait until new relevant vulnerability information is received (block 401).

Server 151 may transmit a notification to mobile communication device 101 via a variety of mechanisms. A notification may be sent via email, text messaging, or through a client-server communication system as described in U.S. patent application Ser. No. 12/372,719, entitled, "SYSTEM AND METHOD FOR REMOTELY SECURING OR RECOVERING A MOBILE DEVICE," and incorporated in full herein. A notification may provide information about a vulnerability, information about a potential vulnerability, the status of a mobile communication device, information about remediation instructions, or may request that the user of an affected mobile communication device perform some action to update the vulnerability information on the mobile communication device, or perform some action to remediate the mobile communication device.

In an embodiment, a notification may contain information or an instruction indicating that the mobile communication device 101 needs to connect to server 151 in order to receive new vulnerability information. The notification may be directed to software resident on the mobile communication device 101, may include software readable remediation instructions, and may be in the form of an SMS or may be sent via a push notification service, such as that provided by Apple Computer Inc. to its iPhone® devices. For example, mobile communication device 101 may receive a notification with instructions that the device should be updated to protect against a new security risk. A specific application on the device may require an update, in which case the notification may also cause mobile communication device 101 to update the specific application without user intervention. In an embodiment, a notification may be directed to the user of the mobile communication device. This may include a text message, push notification, or e-mail message containing human-readable information, or a voicemail or other verbal communication directed to the user of mobile communication device 101. Notifying a mobile communication device 101 allows for rapid response to new vulnerabilities, thereby greatly increasing the effectiveness of systems that would otherwise rely on a scheduled or manually-initiated check for security vulnerabilities.

Figure 5:
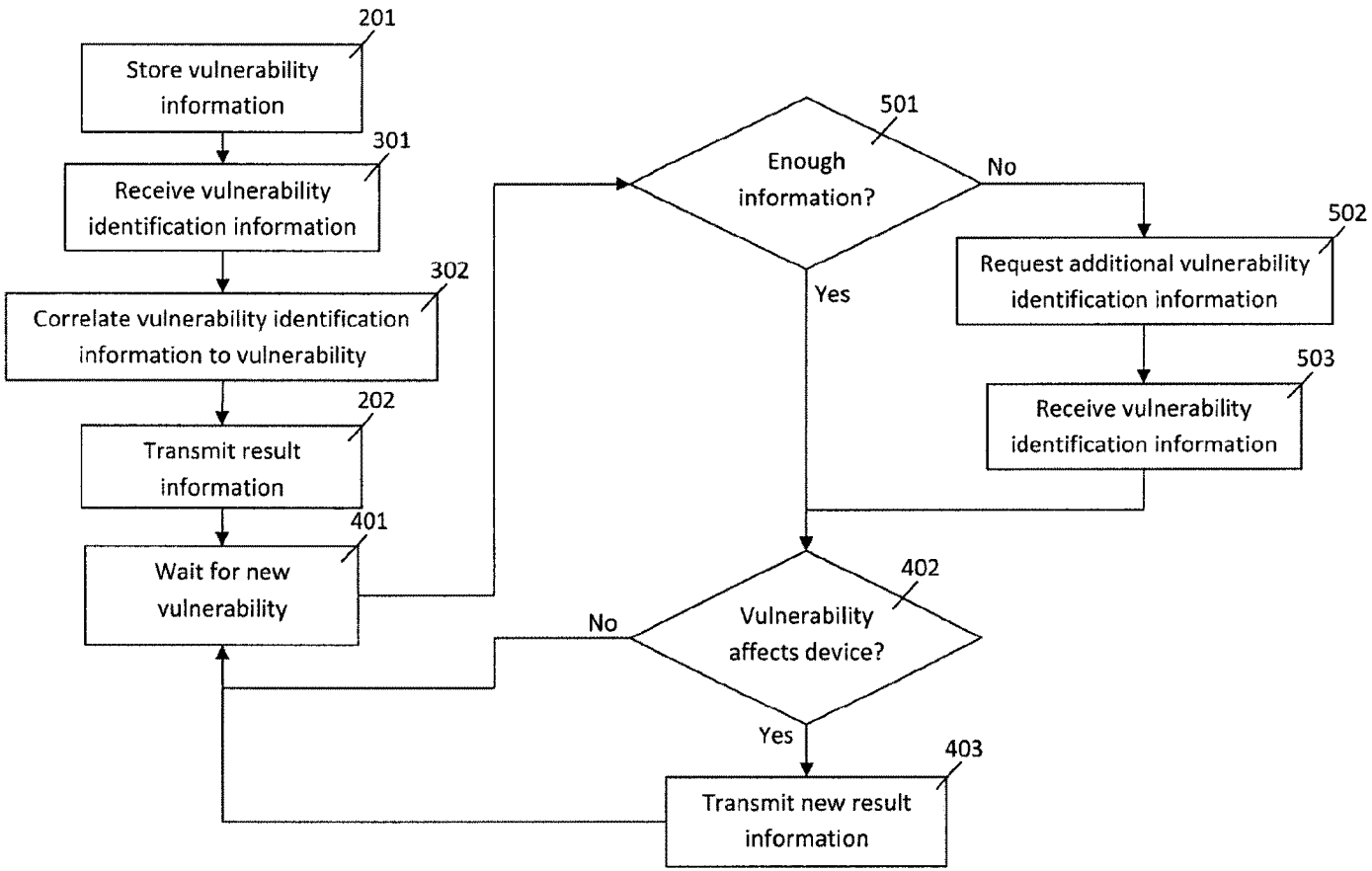
FIG. 5 is an exemplary flow diagram illustrating the steps of an embodiment of the invention.

FIG. 5 illustrates an embodiment in which server 151 may require additional information about a mobile communication device 101 in order to confirm whether a vulnerability affects mobile communication device 101. One will appreciate that the process illustrated in FIG. 5 and described herein may build upon any of the processes discussed herein, or may be performed independently of any of the other processes discussed herein. In block 201 of FIG. 5, data storage 111 stores a plurality of sets of vulnerability information related to one or more mobile communication devices 101. One will appreciate that data storage 111 may be accessed by server 151. In block 301 of FIG. 5, server 151 receives identification information for a mobile communication device 101. In block 302 of FIG. 5, server 151 correlates the received identification information to the stored plurality of sets of vulnerability information to determine which vulnerabilities affect or may affect the mobile communication device 101, which may include accessing data storage 111 by server 151. Server 151 generates a set of result information that in block 202 of FIG. 5 is transmitted to the mobile communication device 101 over network 121.

In block 401 of FIG. 5, server 151 or data storage 111 waits for and receives new vulnerability information. In block 501, server 151 assess whether there is enough information to determine which mobile communication devices may be affected by the newly received vulnerability information. If there is not enough information, then in block 502, server 151 will request additional vulnerability identification information from one or more mobile communication devices 101, and will then receive the additional information from the one or more mobile communication devices 101 in block 503. One will appreciate that the request in block 502 may utilize notification mechanisms such as those described above or may be performed the next time the mobile communication device 101 connects to the server 151. Once the additional information is received, server 151 may make a determination whether the newly received vulnerability information affects any of the one or more mobile communication devices 101 having access to server 151 or data storage 111 (block 402). If the new vulnerability information does affect any of the one or more mobile communication devices 101 having access to server 151 or data storage 111, then in block 403 of FIG. 5, the server 151 will transmit a notification of the new vulnerability to the affected mobile communication devices 101, or may transmit an updated, new or second set of result information regarding the new vulnerability. If the new vulnerability information does not affect any of the mobile communication devices 101 having access to server 151 or data storage 111, then server 151 or data storage 111 may wait until new relevant vulnerability information is received (block 401 of FIG. 5).

One will appreciate that the process illustrated in FIG. 5 includes a situation in which server 151 receives operating system information from a mobile communication device 101. In an embodiment, this information is stored by server 151 in data storage 111 or other accessible storage. Later, after receiving new vulnerability information, server 151 may determine that based on the stored operating system information for mobile communication device 101, the vulnerability could affect mobile communication device 101. However, server 151 may require additional identification information from mobile communication device 101 in order to determine whether the device is actually affected. Server 151 may request additional configuration information from mobile communication device 101. Server 151 will receive the requested identification information and then sends accurate vulnerability information to the device 101.

Figure 6:
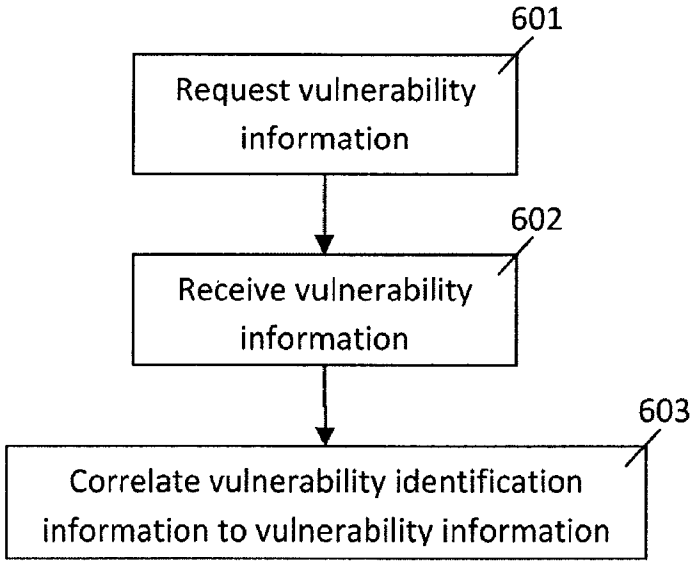
FIG. 6 is an exemplary flow diagram illustrating the steps of an embodiment of the invention.

FIG. 6 is directed to a process in which a mobile communication device 101 having access to server 151 or data storage 111 requests vulnerability information from server 151. In block 601, mobile communication device 101 transmits a request to server 151 for vulnerability information over network 121. In block 602, mobile communication device 101 receives vulnerability information from server 151. One will appreciate that server 151 may access data storage 111 in order to gather and transmit the vulnerability information. In block 603, mobile communication device 101 correlates the received vulnerability information to its own identification information, and makes a determination whether any of the received vulnerability information is relevant to the mobile communication device 101. In this embodiment, vulnerability information processing may thereby be performed by the mobile communication device 101. In an embodiment, both mobile communication device 101 and server 151 perform processing on vulnerability information. For example, the server 151 may send vulnerability information to mobile communication device 101 based on the operating system of mobile communication device 101. In an embodiment, server 151 may use information sent by device 101 (e.g. HTTP header information) in the request 601 or information stored in data storage 111 to determine the operating system of the device 101. The mobile communication device may then use additional information such as the applications installed on the device, configuration information, and the versions of software libraries to perform additional processing, correlating or analysis on the received vulnerability information. One will appreciate that a vulnerability may be rated as severe if the device's configuration makes the vulnerability exploitable by remote parties; however, the vulnerability may be rated as less severe if the device's configuration leaves the vulnerability as not remotely exploitable.

Figure 7:
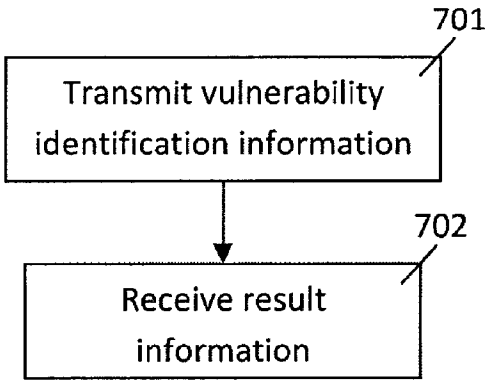
FIG. 7 is an exemplary flow diagram illustrating the steps of an embodiment of the invention.

FIG. 7 is any exemplary flowchart of a process in which a mobile communication device 101 transmits vulnerability identification information to server 151 (block 701), and in response, received result information on (block 702). One will appreciate that this may require access to data storage 111 by server 151. One will also appreciate that the process illustrated in FIG. 7 and described herein may be performed as part of any of the other processes described or illustrated herein, or may be performed independently of the other processes described or illustrated herein.

Figure 8:
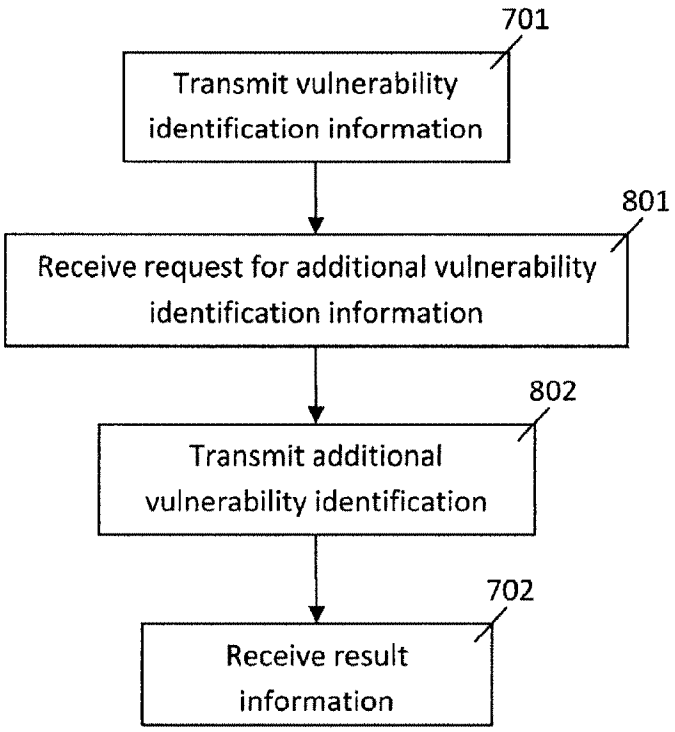
FIG. 8 is an exemplary flow diagram illustrating the steps of an embodiment of the invention.

FIG. 8 is directed to a process in which a mobile communication device 101 transmits additional vulnerability identification information to server 151 in order to receive additional result information relevant to the mobile communication device 101. One will appreciate that the process illustrated in FIG. 8 and disclosed herein may augment any of the other disclosed or illustrated processes. In block 701 of FIG. 8, mobile communication device 101 transmits vulnerability identification information to server 151. In block 801, mobile communication device 101 receives a request for additional identification information from server 151. In block 802, mobile communication device 101 transmits additional vulnerability identification information to server 151. In response, mobile communication device 101 receives correlated result information from server 151 in block 702 of FIG. 8. One will appreciate that server 151 may access data storage 111 in order to provide the relevant result information for transmission to mobile communication device 101.

One will appreciate that the process illustrated in FIG. 8 contemplates a situation in which a mobile communication device 101 first transmits its operating system information to a server 151. Mobile communication device 101 may then receive a request from server 151 for version information pertaining to software libraries installed on the device 101. Mobile communication device 101 may then send the requested information to server 151 and may receive result information correlated to the device's vulnerability given its specific software library version information. If the software library versions installed on mobile communication device 101 are not affected by a specific vulnerability, the result information received by mobile communication device 101 may indicate that the device 101 is not vulnerable to that vulnerability. If, however, the software library versions are affected by a specific vulnerability, then the result information received by mobile communication device 101 may indicate that mobile communication device 101 is vulnerable and may contain instructions for how to remediate the issue.

Figure 9:
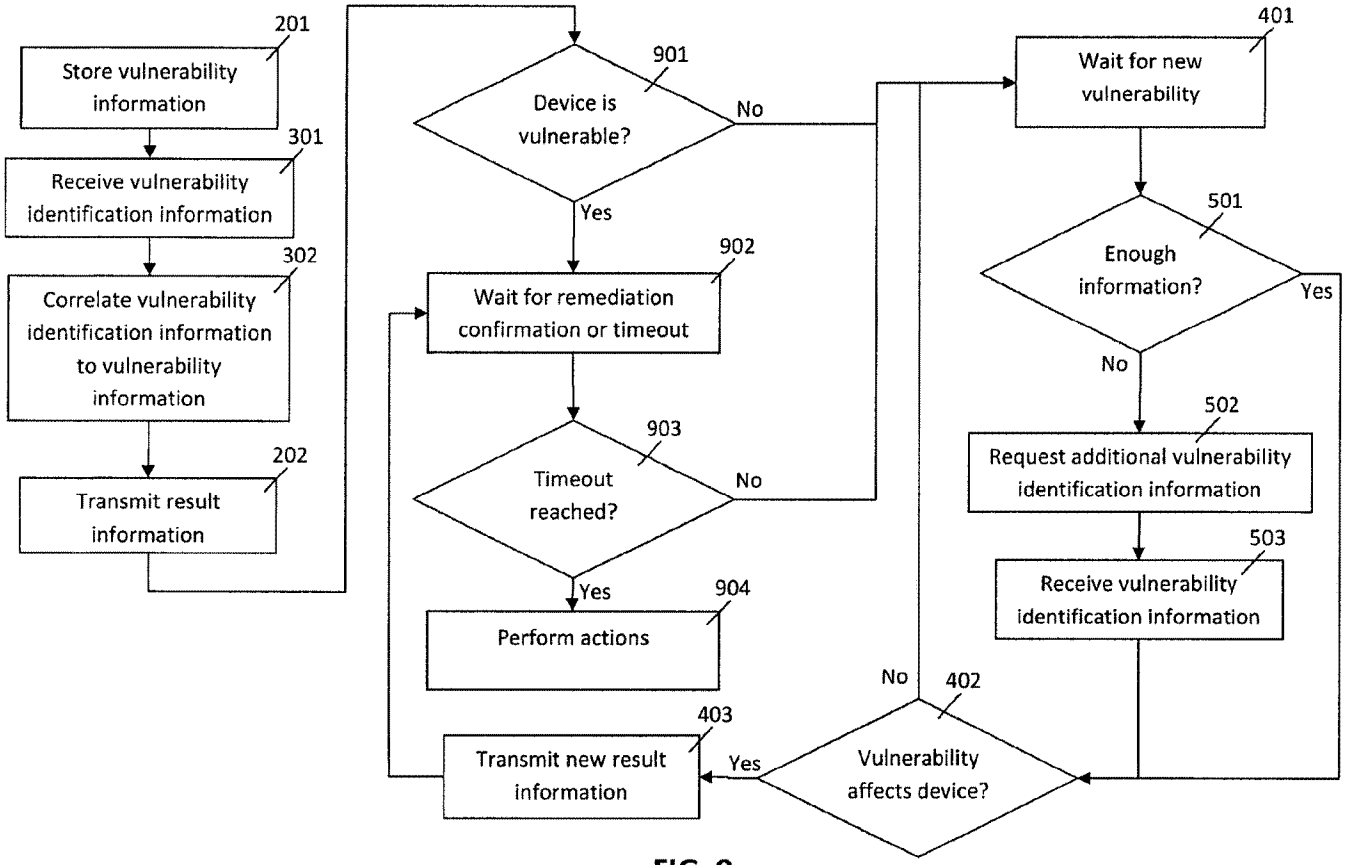
FIG. 9 is an exemplary flow diagram illustrating the steps of an embodiment of the invention.

FIG. 9 illustrates a process in which vulnerabilities on a mobile communication device 101 are remediated. One will appreciate that the process illustrated in FIG. 9 and described herein may be combined with any of the processes discussed herein, or may be performed independently of any of the other processes discussed herein. In block 201 of FIG. 9, data storage 111 stores a plurality of sets of vulnerability information related to one or more mobile communication devices 101. In block 301 of FIG. 9, server 151 receives vulnerability identification information for a mobile communication device 101. In block 302 of FIG. 9, server 151 correlates the received vulnerability identification information to vulnerability information in order to generate a set of result information about vulnerabilities affecting the mobile communication device 101. This step may include accessing data storage 111 by server 151. In block 202 of FIG. 9, result information is transmitted to the mobile communication device 101 over network 121. In an embodiment, the result information may include instructions for the user to remediate vulnerabilities that affect the device 101.

In block 901 of FIG. 9, a determination is made as to whether mobile communication device 101 is vulnerable. This determination may be made using logic resident on mobile communication device 101, or server 151 may perform the analysis. In an embodiment, a device is only vulnerable if it is affected by vulnerabilities that have a certain level of severity. For example, if a device is only susceptible to locally-exploitable vulnerabilities, it may not be considered vulnerable in block 901; however, if the device is vulnerable to remotely-exploitable vulnerabilities or has a virus installed, it may be considered vulnerable in block 901. If mobile communication device 101 is vulnerable, then in block 902, server 151 may be set to wait for confirmation that the mobile communication device 101 has been remediated. Server 151 may be conditioned to wait for confirmation for a certain period of time (block 903).

If the time limit for receiving a remediation confirmation has been exceeded, then in block 904, an action may be taken. For example, server 151 may notify an administrator about the vulnerable mobile communication device and that the user has not taken action in the specified period of time. In this example, an administrator may take manual action such as sending a personal email or otherwise notifying the user to secure the device 101. In an embodiment, server 151 may automatically disable mobile communication device 101 in some fashion to prevent affecting other devices on the network 121 or to prevent further damage. For example, server 151 may prevent mobile communication device 101 from connecting to a specific network, email system, document repository, or other system. Alternatively, server 151 may disable mobile communication device 101 such that an administrator must verify that the device is safe before it is can be used again. Some mechanisms by which the disablement can take place are disclosed in U.S. patent application Ser. No. 12/372,719, entitled, "SYSTEM AND METHOD FOR REMOTELY SECURING OR RECOVERING A MOBILE DEVICE," and U.S. patent application Ser. No. 12/255,632, entitled, "SECURE MOBILE PLATFORM SYSTEM," both of which are incorporated in full herein. In an embodiment, the user of mobile communication device 101 may be notified by server 151 via email, text message or other means of communication that the mobile communication device is vulnerable and that corrective action was not taken within the prescribed time. The notification may serve as a reminder to help the user take action and secure the device. In this fashion, the invention goes beyond simply updating a mobile communication device to ensure security, or periodically scanning mobile communication devices on the network for potential vulnerabilities. As described herein, the invention may provide a customized vulnerability assessment based upon the unique state and configuration of each mobile communication device on the network, and may provide notifications and remediation instructions based upon this unique state and configuration.

One will appreciate that other actions may be performed in order to optimally secure a mobile device once it is known to be vulnerable. The embodiments described herein may be combined as part of a security response process. In an example, a user may receive a direct reminder after one day if his or her device is determined to be vulnerable and is not yet remediated. After two additional days, if the device is still vulnerable, an administrator may be notified and the device disallowed access to email and the organization's VPN service. Once the device is remediated, the administrator may be notified and access to email and VPN may be automatically restored. Other examples are also possible without departing from this disclosure or the scope of the invention.

If in block 903 of FIG. 9, server 151 received confirmation that a vulnerability affecting mobile communication device 101 has been remediated, or if in block 901, mobile communication device 101 is not vulnerable, then in block 401 of FIG. 9, server 151 may wait for receipt of new vulnerability information. In block 501 of FIG. 9, server 151 may assess whether there is enough information to determine if mobile communication device 101 is affected by the newly received vulnerability information. If there is not enough information, then in block 502 of FIG. 9, server 151 will request additional vulnerability identification information from mobile communication device 101, and will then receive the additional vulnerability identification information from mobile communication device 101 in block 503 of FIG. 9. Once the additional vulnerability identification information is received, server 151 may make a determination whether the newly received vulnerability information affects mobile communication device 101 (block 402 of FIG. 9), thereby generating a new, updated or second set of result information. If the new vulnerability information does affect mobile communication device 101, then in block 403 of FIG. 9, server 151 may send a notification of the new vulnerability information to the affected mobile communication device 101, or may send information relating to the new vulnerability to mobile communication device 101. If the new vulnerability information does not affect mobile communication device 101, then server 151 or data storage 111 will wait until new relevant vulnerability information is received (block 401 of FIG. 9). One will appreciate that the portions of the process for remediating vulnerabilities present on the mobile communication device 101 may be performed in conjunction with any of the other processes disclosed herein.

Figure 10:
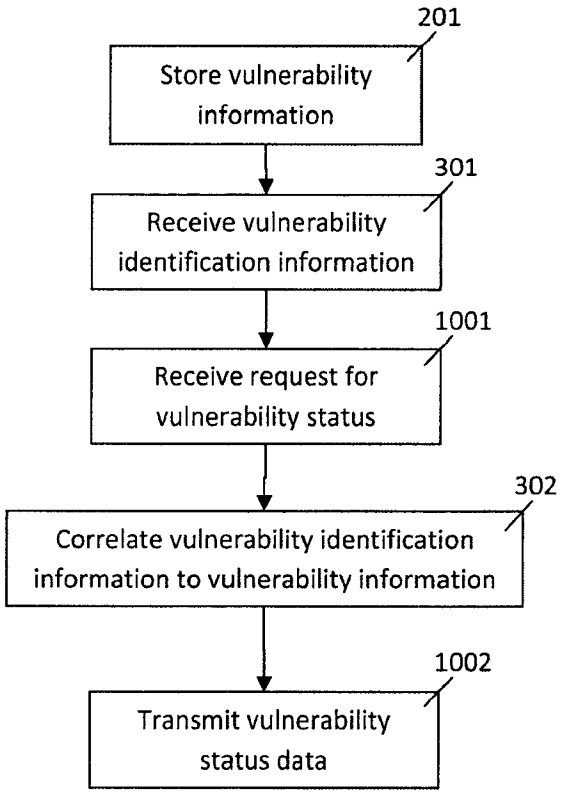
FIG. 10 is an exemplary flow diagram illustrating the steps of an embodiment of the invention.

FIG. 10 is directed to a process for generating data for display, e.g. on a web interface. In an embodiment, a user of the mobile communication device 101, administrator for a group of mobile communication devices 101, administrator for server 151, or other party may wish to check the security status of mobile communication devices 101 connected to the network 121. This may be helpful for identifying which mobile communication devices are vulnerable, identifying which need manual remediation or intervention from an administrator, determining the risk posed by a new vulnerability, and performing other actions relevant to securing a group of mobile communication devices. It may also be helpful to provide a single graphical user interface that displays information on mobile communication devices having access to server 151.

In block 201 of FIG. 10, data storage 111 stores a plurality of sets of vulnerability information that may be accessed by server 151. In block 301 of FIG. 10, server 151 receives vulnerability identification information for one or more mobile communication devices 101 connected to network 121. In block 1001, server 151 receives a request for the status of vulnerabilities for the one or more mobile communication devices 101. This request may originate from one of the one or more mobile communication devices 101, or from a web interface. In block 302 of FIG. 10, server 151 correlates the received set of vulnerability identification information to at least one of the plurality of sets of vulnerability information to identify vulnerabilities that affect or may affect any of the one or more mobile communication devices 101 connected to server 151 on network 121. In block 1002, server 151 transmits the status of vulnerabilities for any of the one or more mobile communication devices 101 for display on a web page or other interface. One will appreciate that the status may include whether any of the vulnerabilities have been remediated, and if not, which mobile communication device 101 still suffers from vulnerabilities that have not been remediated. The actions in block 302 may be performed before server 151 receives a request for vulnerability status. The result of the correlation may be stored by the server 151 so that when the server receives a request for vulnerability status, the server 151 recalls the previous results. The storage may be in a database, in-memory cache, or other method of storing and recalling data available to server 151.

In an embodiment, the data transmitted by server 151 in block 1002 of FIG. 10 may pertain to an individual mobile communication device, multiple devices, or a group of devices. The data may include information about specific individual devices or aggregated information relating to multiple devices. The information about an individual device may include the device's security status (e.g. vulnerable/not vulnerable, severity of vulnerability, number of unremediated vulnerabilities), software version information, phone number, count of security events in a time period, or last time communicating with server 151. Aggregated information relating to a group of devices may include the percentage of devices in the group that are vulnerable, the number of devices in the group that are vulnerable, the overall risk level of the group, or other information that can be combined between specific devices in the group. Server 151 may automatically group devices using criteria such as common characteristics (e.g. operating system type, operating system version, having the presence of certain software, having a certain configuration, etc.), or common security statuses (e.g. being vulnerable, being not vulnerable, being affected by a specific vulnerability, being out of compliance, awaiting remediation, etc.).

In an embodiment, the data transmitted by server 151 in block 1002 of FIG. 10 may be selected by receiving searching or sorting information in the request 1001. The search or sort may reference any information stored by the server relating to specific devices. For example, a user may search for all devices with a specific piece of software installed or may sort devices based on highest severity. In an embodiment, the data transmitted by server 151 in block 1002 includes a prioritized list of current security issues. This list may also include recommended actions to remediate the issues and the ability to initiate such actions. For example, in a large mobile device deployment, the list of current issues may include iPhone® vulnerability that is severe and affects 1000 devices, an Android™ vulnerability that is of moderate severity and affects 1200 devices, a Windows Mobile vulnerability that is severe and affects 100 devices, and a Blackberry vulnerability that is of low severity and affects 3000 devices. The prioritization in this case takes into account both the severity of the vulnerability and the number of devices that are part of the deployment and affected by the vulnerability.

In an embodiment, server 151 may transmit reports based on security status information available at the server. The reports may show changes in security status over time or show a current summary. Some example reports include the number of vulnerable of devices with respect to time, the current number of vulnerable devices with each severity level, the current number of vulnerable devices broken down by operating system type, and a list of contact information for users with the most severely vulnerable devices.

In an embodiment, server 151 may transmit security related events that are generated both by clients and by server 151 due to automatic or administrative action. The events may be displayed, gathered, processed, or otherwise interacted with as disclosed in U.S. patent application Ser. No. 12/255,635, entitled, "SECURITY STATUS AND INFORMATION DISPLAY SYSTEM," which is incorporated in full herein.

In an embodiment, server 151 allows an administrator to perform actions related to a device or group of devices. Actions that may be performed include notifying the user of the device via a push notification, text message, email, or another messaging system; disabling the device; disabling the device's access to a service, potentially using a mechanism disclosed in U.S. patent application Ser. No. 12/255,632, entitled, "SECURE MOBILE PLATFORM SYSTEM"; or those disclosed in U.S. patent application Ser. No. 12/372,719, entitled, "SYSTEM AND METHOD FOR REMOTELY SECURING OR RECOVERING A MOBILE DEVICE," both of which are incorporated in full herein.

In an embodiment, server 151 allows an administrator to configure how the server operates. One such configuration may include custom triggers or alerts on certain events (e.g. devices not remediating in a period of time) that will result in logging and administrator notification via email, text message, or other messaging medium. Other examples of configuration options include: the time period the server waits before notifying an administrator of an un-remediated vulnerable device, the email address or addresses administrators should be notified at, how often to remind users of vulnerable devices that they need to take remediation actions, what method of contact server 151 should use to remind users (e.g. SMS, E-mail, push notification service), how the server interacts with e-mail or VPN services to disable access for a specific vulnerable device, and other ways of controlling the functionality disclosed herein.

In an embodiment, vulnerability identification information is stored by server 151 so that, in the case of a new vulnerability, server 151 can determine whether the device is vulnerable, not vulnerable, or potentially vulnerable based on the information is has. In an embodiment, the server stores vulnerability identification information on data storage 111. This allows an IT admin to get an instant picture of the security risk of their device deployment in the case of a new emerging vulnerability. Such rapid understanding is critical to prioritize response effort in the case of a rapidly spreading worm or severe vulnerability.

Figure 11:
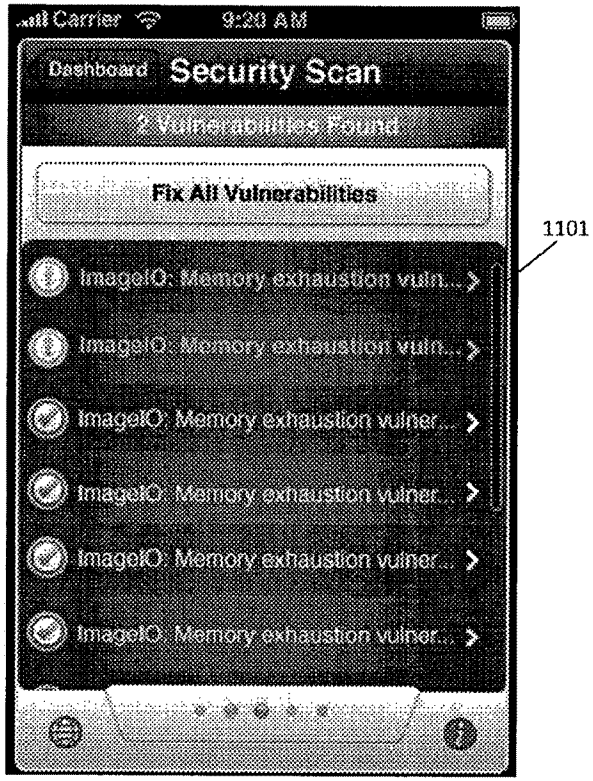
FIG. 11 is an exemplary screenshot illustrating an embodiment of the invention.

FIG. 11 is an exemplary screenshot of result information being displayed on a mobile communication device 101. As shown, two vulnerabilities have been identified as affecting the mobile communication device. One will appreciate that these vulnerabilities may have been identified by server 151 after receipt of vulnerability identification information from mobile communication device 101, as described above and illustrated in the Figures. As previously discussed, the identified vulnerabilities may specifically affect mobile communication device 101 because of its particular operating system version, firmware version, or software, or may be a general vulnerability that affects all similar makes and models of mobile communication device 101. As shown, multiple vulnerabilities are shown to not affect the mobile communication device 101. In an embodiment, these vulnerabilities are vulnerabilities that may affect similar makes and models of mobile device but do not affect the specific device 101. In an embodiment, result information display 1101 may link to another screen or to a website with more information on a vulnerability, including instructions on how to remediate the vulnerability. In an embodiment, the result information display 1101 may occur due to the result of the device 101 receiving result information sent by the server in response to a request from the device 101. In an embodiment, the result information display 1101 may occur due to the device receiving a notification that the device 101 is vulnerable. One will appreciate that other situations may prompt the display of result information on device 101 without departing from this disclosure. One will appreciate that other screen layouts are possible, and that the screen depicted in FIG. 11 is not meant to limit the invention in any fashion.

In the description above and throughout, numerous specific details are set forth in order to provide a thorough understanding of the invention. It will be evident, however, to one of ordinary skill in the art, that the invention may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of the invention. One will appreciate that these steps are merely exemplary and are not meant to be limiting in any way. Other steps and functions may be contemplated without departing from this disclosure or the scope of the invention.

What is claimed is:

[1. A method comprising:

a) providing at least one server that accesses a data storage storing a plurality of sets of vulnerability information;

b) receiving, at the at least one server, a set of vulnerability identification information about a mobile communication device;

c) correlating, by the at least one server, the received set of vulnerability identification information to at least one of the plurality of sets of vulnerability information to generate a first set of result information; and, d) transmitting, by the at least one server, the first set of result information.]

[2. The method of claim 1, wherein the vulnerability identification information is information selected from the group consisting of an operating system type, an operating system version, a firmware version, a device model, carrier information, authentication information, user information, configuration information for the mobile communication device, hardware information, a list of files, a list of software components, a list of libraries, and a list of software applications on the mobile communication device.]

[3. The method of claim 1, wherein vulnerability information is information selected from the group consisting of a name, a description, a remediation instruction, a severity rating, a security impact summary, and a criterion for being vulnerable.]

[4. The method of claim 1, further comprising the step of:

e) transmitting, by the at least one server to the mobile communication device, a notification about the first set of result information.]

[5. The method of claim 4, wherein the notification includes an instruction related to the first set of result information.]

[6. The method of claim 1, further comprising the steps of:

e) updating at least one of the plurality of sets of vulnerability information on the data storage to form a plurality of updated sets of vulnerability information;

f) after the step of transmitting, by the at least one server, the first set of result information, correlating, by the at least one server, the received set of vulnerability identification information to the plurality of updated sets of vulnerability information to generate a second set of result information; and, g) transmitting, by the at least one server, the second set of result information.]

[7. The method of claim 1, further comprising the steps of:

e) updating at least one of the plurality of sets of vulnerability information on the data storage to form a plurality of updated sets of vulnerability information;

f) after the step of transmitting, by the at least one server, the first set of result information, correlating, by the at least one server, the received set of vulnerability identification information to the plurality of updated sets of vulnerability information to generate a second set of result information; and, g) transmitting, by the at least one server to the mobile communication device, a notification about the second set of result information.]

[8. The method of claim 1, further comprising the steps of:

e) receiving, at the data storage, a new set of vulnerability information to form an updated plurality of sets of vulnerability information;

f) after the step of transmitting, by the at least one server, the first set of result information, correlating, by the at least one server, the received set of vulnerability identification information to the updated plurality of sets of vulnerability information to generate a second set of result information; and, g) transmitting, by the at least one server, the second set of result information.]

[9. The method of claim 1, further comprising the steps of:

e) receiving, at the data storage, a new set of vulnerability information to form an updated plurality of sets of vulnerability information;

f) after the step of transmitting, by the at least one server, the first set of result information, correlating, by the at least one server, the received set of vulnerability identification information to the updated plurality of sets of vulnerability information to generate a second set of result information; and, g) transmitting, by the at least one server to the mobile communication device, a notification about the second set of result information.]

[10. A method comprising:

a) transmitting, from a mobile communication device, a set of vulnerability identification information to at least one server that accesses a data storage storing a plurality of sets of vulnerability information; and, b) receiving, at the mobile communication device from the at least one server, a first set of result information that correlates to the transmitted set of vulnerability identification information.]

[11. The method of claim 10, wherein the vulnerability identification information is information selected from the group consisting of an operating system type, an operating system version, a firmware version, a device model, carrier information, authentication information, user information, configuration information for the mobile communication device, hardware information, a list of files, a list of software components, a list of libraries, and a list of software applications on the mobile communication device.]

[12. The method of claim 10, wherein vulnerability information is information selected from the group consisting of a name, a description, a remediation instruction, a severity rating, a security impact summary, and a criterion for being vulnerable.]

[13. The method of claim 10, further comprising the step of:

c) receiving, at the mobile communication device from the at least one server, a notification about the first set of result information.]

[14. The method of claim 13, wherein the notification includes an instruction related to the first set of result information.]

[15. The method of claim 13, further comprising the step of:

d) displaying, on the mobile communication device, at least a portion of the received notification.]

[16. The method of claim 10, further comprising the step of:

c) receiving, at the mobile communication device from the at least one server, a notification about a second set of result information.]

[17. A method comprising:

a) providing at least one server that accesses a data storage storing a plurality of sets of vulnerability information;

b) receiving, at the at least one server, a first set of vulnerability identification information about a first mobile communication device;

c) correlating, by the at least one server, the first set of vulnerability identification information to at least one of the plurality of sets of vulnerability information to generate a first set of result information; and, d) transmitting, by the at least one server, the first set of result information;

e) receiving, at the at least one server, a second set of vulnerability identification information about a second mobile communication device, wherein the second set of vulnerability identification information differs from the first set of vulnerability identification information;

f) correlating, by the at least one server, the second set of vulnerability identification information to at least one of the plurality of sets of vulnerability information to generate a second set of result information; and, g) transmitting, by the at least one server, the second set of result information.]

[18. The method of claim 17, wherein the vulnerability identification information is information selected from the group consisting of an operating system type, an operating system version, a firmware version, a device model, carrier information, authentication information, user information, configuration information for the mobile communication device, hardware information, a list of files, a list of software components, a list of libraries, and a list of software applications on the mobile communication device.]

[19. The method of claim 17, wherein vulnerability information is information selected from the group consisting of a name, a description, a remediation instruction, a severity rating, a security impact summary, and a criterion for being vulnerable.]

[20. A system comprising:

a data storage storing a plurality of sets of vulnerability information;

a server for accessing the data storage, for receiving one or more sets of vulnerability identification information about one or more mobile communication devices, for correlating the one or more sets of received vulnerability identification information to at least one of the plurality of sets of vulnerability information to generate one or more sets of result information, for transmitting the one or more sets of result information, and for transmitting one or more notifications about the one or more sets of result information; and, a network connecting the at least one server, data storage, and the plurality of mobile communication devices.]

[21. The system of claim 20, further comprising a user interface for monitoring the plurality of mobile communication devices to identify which of the plurality of mobile communication devices is vulnerable.]

[22. The system of claim 20, wherein vulnerability information is information selected from the group consisting of a name, a description, one or more remediation instructions, a severity rating, a security impact summary, and one or more criteria for being vulnerable.]

[23. A method comprising:

a) providing at least one server that accesses a data storage storing a plurality of sets of vulnerability information;

b) receiving, at the at least one server, a set of vulnerability identification information about a mobile communication device;

c) correlating, by the at least one server, the received set of vulnerability identification information to at least one of the plurality of sets of vulnerability information to generate a first set of result information; and, d) transmitting, by the at least one server to the mobile communication device, a notification about the first set of result information.]

[24. The method of claim 23, wherein the vulnerability identification information is information selected from the group consisting of an operating system type, an operating system version, a firmware version, a device model, carrier information, authentication information, user information, configuration information for the mobile communication device, hardware information, a list of files, a list of software components, a list of libraries, and a list of software applications on the mobile communication device.]

[25. The method of claim 23, wherein vulnerability information is information selected from the group consisting of a name, a description, a remediation instruction, a severity rating, a security impact summary, and a criterion for being vulnerable.]

[26. The method of claim 23, further comprising the steps of:

e) receiving, at the data storage, a new set of vulnerability information to form an updated plurality of sets of vulnerability information;

f) correlating, by the at least one server, the received set of vulnerability identification information to the updated plurality of sets of vulnerability information to generate a second set of result information; and, g) transmitting, by the at least one server, the second set of result information.]

[27. The method of claim 23, further comprising the steps of:

e) receiving, at the data storage, a new set of vulnerability information to form an updated plurality of sets of vulnerability information;

f) correlating, by the at least one server, the received set of vulnerability identification information to the updated plurality of sets of vulnerability information to generate a second set of result information; and, g) transmitting, by the at least one server to the mobile communication device, a notification about the second set of result information.]

*28. A method comprising:*

*accessing, by a server, a data storage storing a plurality of sets of vulnerability information, the vulnerability information including descriptions of known vulnerabilities;*

*receiving, by the server, a plurality of sets of vulnerability identification information corresponding to a plurality of mobile communications devices;*

*correlating, by the server, the received plurality of sets of vulnerability identification information to the plurality of sets of vulnerability information accessed from the data storage to generate a set of result information;*

*transmitting, by the server, the set of result information for display to an administrator;*

*receiving, by the server from the administrator in response to the administrator's review of at least a subset of the set of result information, instructions to perform a first action to remediate a vulnerability of at least one of the plurality of mobile communications devices.*

*29. The method of claim 28, wherein the action to remediate includes instructing the at least one of the plurality of mobile communications devices to connect to the server.*

*30. The method of claim 29, wherein the action to remediate includes instructing the at least one of the plurality of mobile communications devices to connect to the server to receive new vulnerability information.*

*31. The method of claim 28 wherein the action to remediate initiates, without user intervention, an update of an application on the at least one of the plurality of mobile communications devices.*

*32. The method of claim 28 further comprising:*

*performing, by the server, the first action to remediate a vulnerability of at least one of the plurality of mobile communications devices;*

*waiting, by the server, for a confirmation related to the performed first action from the at least one of the plurality of mobile communications devices;*

*when a first threshold value of time has passed without receiving the confirmation, performing, by the server, a second action to remediate a vulnerability of the at least one of the plurality of mobile communications devices.*

*33. The method of claim 32, wherein the first action or the second action includes one of:*

*notifying an administrator of the at least one of the plurality of mobile communications devices;*

*notifying a user of the at least one of the plurality of mobile communications devices;*

*automatically disabling the at least one of the plurality of mobile communications devices; and*

*preventing the at least one of the plurality of mobile communications devices from making a connection.*

*34. The method of claim 32, wherein the first action or the second action includes one of:*

*automatically disabling the at least one of the plurality of mobile communications devices either partially or fully and*

*preventing the at least one of the plurality of mobile communications devices from making a connection, the method further comprising:*

*requiring, by the server, a verification that the at least one of the plurality of mobile communications devices is secure before the mobile communications device is re-enabled or allowed to make the connection.*

*35. The method of claim 28, wherein the first action includes initiating a pre-defined security response process.*

*36. The method of claim 35, wherein the pre-defined security response process includes:*

*notifying, by the server, a user of a vulnerability in the user's mobile communications device;*

*providing the user with instructions to remediate the vulnerability;*

*after a first threshold period of time has passed without receiving confirmation that the vulnerability has been remediated, reminding, by the server, the user of the vulnerability; and*

*after a second threshold period of time without receiving confirmation that the vulnerability has been remediated, performing, by the server, at least one of automatically disabling the user's mobile communications device either partially or fully and preventing the user's mobile communications device from making a connection.*

*37. The method of claim 28 further comprising:*

*providing, by the server, a graphical user interface for displaying the subset of the set of result information and wherein the instructions received by the server from the administrator are received through the graphical user interface.*

*38. The method of claim 37, wherein the subset of the set of result information includes, for each of the plurality of mobile communications devices, at least one of:*

*a device security status;*

*a software version;*

*a count of security events in a pre-determined time period; or*

*a time period since a last communication between the mobile communications device and the server.*

*39. The method of claim 37, wherein the subset of the set of result information includes aggregated information related to the plurality of mobile communications devices.*

*40. The method of claim 39, wherein the aggregated information includes at least one of:*

*a percentage of devices in the plurality of mobile communications devices that are vulnerable, or*

*a number of devices in the plurality of mobile communications devices that are vulnerable.*

*41. The method of claim 39, wherein the subset of result information corresponds to a subset of the plurality of mobile communications devices, the subset of the plurality of mobile communications devices being chosen based on a commonality including at least one of:*

*a characteristic of the mobile communications devices, or*

*a security status of the mobile communications devices.*

*42. A system comprising:*

*a data storage storing a plurality of sets of vulnerability information, the vulnerability information including descriptions of known vulnerabilities;*

*a server for performing the steps of:*

*accessing the data storage storing a plurality of sets of vulnerability information,*

*receiving a plurality of sets of vulnerability identification information corresponding to a plurality of mobile communications devices,*

*correlating the received plurality of sets of vulnerability identification information to the plurality of sets of vulnerability information accessed from the data storage to generate a set of result information,*

*transmitting the set of result information for display to an administrator, and*

*receiving, from the administrator in response to the administrator's review of at least a subset of the set of result information, instructions to perform a first action to remediate a vulnerability of at least one of the plurality of mobile communications devices; and*

*a network connecting the server, data storage, and the plurality of mobile communications devices.*

*43. The system of claim 42, wherein the server is further for performing the steps of:*

*performing the first action to remediate a vulnerability of at least one of the plurality of mobile communications devices;*

*waiting for a confirmation related to the performed first action from the at least one of the plurality of mobile communications devices;*

*when a first threshold value of time has passed without receiving the confirmation, performing, by the server, a second action to remediate a vulnerability of the at least one of the plurality of mobile communications devices.*

*44. The system of claim 43, wherein the first action or the second action includes one of:*

*notifying an administrator of the at least one of the plurality of mobile communications devices;*

*notifying a user of the at least one of the plurality of mobile communications devices;*

*automatically disabling the at least one of the plurality of mobile communications devices; and*

*preventing the at least one of the plurality of mobile communications devices from making a connection.*

*45. The system of claim 43, wherein the first action or the second action includes one of:*

*automatically disabling the at least one of the plurality of mobile communications devices either partially or fully and*

*preventing the at least one of the plurality of mobile communications devices from making a connection, and wherein the server is further for performing the steps of:*

*requiring a verification that the at least one of the plurality of mobile communications devices is secure before the mobile communications device is re-enabled or allowed to make the connection.*

*46. The system of claim 42 wherein the server is further for performing the steps of:*

*providing a graphical user interface for displaying the subset of the set of result information and wherein the instructions received by the server from the administrator are received through the graphical user interface.*

*47. The system of claim 46, wherein the subset of the set of result information includes, for each of the plurality of mobile communications devices, at least one of:*

*a device security status;*

*a software version;*

*a count of security events in a pre-determined time period; or*

*a time period since a last communication between the mobile communications device and the server.*

*48. The system of claim 46, wherein the subset of the set of result information includes aggregated information related to the plurality of mobile communications devices.*

*49. The system of claim 48, wherein the aggregated information includes at least one of:*

*a percentage of devices in the plurality of mobile communications devices that are vulnerable, or*

*a number of devices in the plurality of mobile communications devices that are vulnerable.*

*50. The system of claim 48, wherein the subset of result information corresponds to a subset of the plurality of mobile communications devices, the subset of the plurality of mobile communications devices being chosen based on a commonality including at least one of:*

*a characteristic of the mobile communications devices, or a security status of the mobile communications devices.*

*51. A non-transitory, computer-readable storage medium having stored thereon a plurality of instructions, which, when executed by a processor of a server, cause the server to perform the steps of:*

*accessing a data storage storing a plurality of sets of vulnerability information, the vulnerability information including descriptions of known vulnerabilities;*

*receiving a plurality of sets of vulnerability identification information corresponding to a plurality of mobile communications devices;*

*correlating the received plurality of sets of vulnerability identification information to the plurality of sets of vulnerability information accessed from the data storage to generate a set of result information;*

*transmitting the set of result information for display to an administrator; and*

*receiving, from the administrator in response to the administrator's review of at least a subset of the set of result information, instructions to perform a first action to remediate a vulnerability of at least one of the plurality of mobile communications devices.*

*52. The computer-readable storage medium of claim 51, the instructions further causing the server to perform the steps of:*

*performing the first action to remediate a vulnerability of at least one of the plurality of mobile communications devices;*

*waiting for a confirmation related to the performed first action from the at least one of the plurality of mobile communications devices; and*

*when a first threshold value of time has passed without receiving the confirmation, performing a second action to remediate a vulnerability of the at least one of the plurality of mobile communications devices.*

*53. The computer-readable storage medium of claim 52, wherein the first action or the second action includes one of:*

*notifying an administrator of the at least one of the plurality of mobile communications devices;*

*notifying a user of the at least one of the plurality of mobile communications devices;*

*automatically disabling the at least one of the plurality of mobile communications devices; and*

*preventing the at least one of the plurality of mobile communications devices from making a connection.*

*54. The computer-readable storage medium of claim 52, wherein the first action or the second action includes one of:*

*automatically disabling the at least one of the plurality of mobile communications devices either partially or fully and*

*preventing the at least one of the plurality of mobile communications devices from making a connection, and wherein the server is further for performing the steps of:*

*requiring a verification that the at least one of the plurality of mobile communications devices is secure before the mobile communications device is re-enabled or allowed to make the connection.*

*55. The computer-readable storage medium of claim 51, the instructions further causing the server to perform the steps of:*

*providing a graphical user interface for displaying the subset of the set of result information and wherein the instructions received by the server from the administrator are received through the graphical user interface.*

*56. The computer-readable storage medium of claim 55, wherein the subset of the set of result information includes, for each of the plurality of mobile communications devices, at least one of:*

*a device security status;*

*a software version;*

*a count of security events in a pre-determined time period; or*

*a time period since a last communication between the mobile communications device and the server.*

*57. The computer-readable storage medium of claim 55, wherein the subset of the set of result information includes aggregated information related to the plurality of mobile communications devices.*

*58. The computer-readable storage medium of claim 57, wherein the aggregated information includes at least one of:*

*a percentage of devices in the plurality of mobile communications devices that are vulnerable, or*

*a number of devices in the plurality of mobile communications devices that are vulnerable.*

*59. The computer-readable storage medium of claim 57, wherein the subset of result information corresponds to a subset of the plurality of mobile communications devices, the subset of the plurality of mobile communications devices being chosen based on a commonality including at least one of:*

*a characteristic of the mobile communications devices, or*

*a security status of the mobile communications devices.*

* * * * *